(12) United States Patent
Visco et al.

(10) Patent No.: US 12,482,857 B2
(45) Date of Patent: Nov. 25, 2025

(54) GLASS SOLID ELECTROLYTE LAYER, METHODS OF MAKING GLASS SOLID ELECTROLYTE LAYER AND ELECTRODES AND BATTERY CELLS THEREOF

(71) Applicant: PolyPlus Battery Company, Berkeley, CA (US)

(72) Inventors: Steven J. Visco, Berkeley, CA (US); Vitaliy Nimon, Berkeley, CA (US); Valentina Loginova, Berkeley, CA (US); Yevgeniy S. Nimon, Berkeley, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

(21) Appl. No.: 18/671,767

(22) Filed: May 22, 2024

(65) Prior Publication Data
US 2024/0347763 A1    Oct. 17, 2024

Related U.S. Application Data

(62) Division of application No. 17/303,706, filed on Jun. 4, 2021, now Pat. No. 12,034,116.
(Continued)

(51) Int. Cl.
*H01M 10/0562*    (2010.01)
*C03C 15/00*    (2006.01)
*H01M 10/0525*    (2010.01)

(52) U.S. Cl.
CPC ......... *H01M 10/0562* (2013.01); *C03C 15/00* (2013.01); *H01M 10/0525* (2013.01); *H01M 2300/0068* (2013.01)

(58) Field of Classification Search
CPC ............... C03C 15/00; C03C 2218/33; H01M 10/0562; H01M 10/0525
See application file for complete search history.

(56) References Cited

U.S. PATENT DOCUMENTS

| 3,994,676 A | 11/1976 | Strimple et al. |
| 4,037,043 A | 7/1977 | Segsworth |
| | (Continued) | |

FOREIGN PATENT DOCUMENTS

| BR | 112017011548 A2 | 7/2018 |
| BR | 112017011768 A2 | 7/2018 |
| | (Continued) | |

OTHER PUBLICATIONS

Akridge, James R. et al., "Solid state batteries using vitreous solid electrolytes," Solid State Ionics 18 & 19 (1986) 1082-1087.
(Continued)

*Primary Examiner* — Amanda C. Walke
(74) *Attorney, Agent, or Firm* — Weaver Austin Villeneuve & Sampson LLP

(57) ABSTRACT

Battery component structures and manufacturing methods for solid-state battery cells include a unitary Li ion conducting sulfide glass solid electrolyte structure that serves as the basic building block around which a solid-state battery cell can be fabricated. The unitary glass structure approach can leverage precision controlled high throughput processes from the semiconductor industry that have been inventively modified as disclosed herein for processing a sulfide glass solid electrolyte substrate into a unitary Li ion conducting glass structure, for example, by using etching and lithographic photoresist formulations and methods. The glass substrate may be precision engineered to effectuate a dense glass portion and a porous glass portion that can be characterized as sublayers having predetermined thicknesses. The porous glass sublayer includes a plurality of discrete
(Continued)

substantially vertical closed-end holes or trenches that are precision engineered into one or both major substrate surfaces using microfabrication processes.

6 Claims, 9 Drawing Sheets

Related U.S. Application Data

(60) Provisional application No. 62/706,416, filed on Aug. 14, 2020, provisional application No. 63/064,945, filed on Aug. 13, 2020, provisional application No. 63/061,121, filed on Aug. 4, 2020.

(56) References Cited

U.S. PATENT DOCUMENTS

| | | |
|---|---|---|
| 4,042,482 A | 8/1977 | Shannon et al. |
| 4,090,054 A | 5/1978 | Heine et al. |
| 4,121,985 A | 10/1978 | Cherenko |
| 4,208,474 A | 6/1980 | Jacobson et al. |
| 4,331,750 A | 5/1982 | Malugani et al. |
| 4,444,857 A | 4/1984 | Duchange et al. |
| 4,447,393 A | 5/1984 | Weirauch |
| 4,465,745 A | 8/1984 | Akridge |
| 4,465,746 A | 8/1984 | Akridge |
| 4,477,545 A | 10/1984 | Akridge et al. |
| 4,478,920 A | 10/1984 | Gabano et al. |
| 4,513,070 A | 4/1985 | Carette et al. |
| 4,529,027 A | 7/1985 | Brice et al. |
| 4,585,714 A | 4/1986 | Akridge |
| 4,599,284 A | 7/1986 | Akridge |
| 4,601,961 A | 7/1986 | McCartney |
| 4,735,850 A | 4/1988 | Eitman |
| 4,806,439 A | 2/1989 | Wessling et al. |
| 4,863,553 A | 9/1989 | Lehoczky et al. |
| 4,863,798 A | 9/1989 | Arenz et al. |
| 4,985,317 A | 1/1991 | Adachi et al. |
| 5,246,782 A | 9/1993 | Kennedy et al. |
| 5,314,765 A | 5/1994 | Bates |
| 5,338,625 A | 8/1994 | Bates et al. |
| 5,424,147 A | 6/1995 | Khasin et al. |
| 5,455,126 A | 10/1995 | Bates et al. |
| 5,512,147 A | 4/1996 | Bates et al. |
| 5,523,178 A | 6/1996 | Murakami et al. |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,686,201 A | 11/1997 | Chu |
| 5,702,995 A | 12/1997 | Fu |
| 5,814,420 A | 9/1998 | Chu |
| 5,824,434 A | 10/1998 | Kawakami et al. |
| 5,958,281 A | 9/1999 | Takada et al. |
| 5,961,672 A | 10/1999 | Skotheim et al. |
| 6,030,909 A | 2/2000 | Fu |
| 6,042,739 A * | 3/2000 | Itoh .................. C03C 15/00 216/96 |
| 6,214,061 B1 | 4/2001 | Visco et al. |
| 6,315,881 B1 | 11/2001 | Fu |
| 6,402,795 B1 | 6/2002 | Chu et al. |
| 6,405,565 B1 | 6/2002 | Aitken et al. |
| 6,413,285 B1 | 7/2002 | Chu et al. |
| 6,432,584 B1 | 8/2002 | Visco et al. |
| 6,479,028 B1 | 11/2002 | Kaner et al. |
| 6,485,622 B1 | 11/2002 | Fu |
| 6,723,140 B2 | 4/2004 | Chu et al. |
| 6,733,924 B1 | 5/2004 | Skotheim et al. |
| 6,797,428 B1 | 9/2004 | Skotheim et al. |
| 7,211,532 B2 | 5/2007 | Fu |
| 7,247,408 B2 | 7/2007 | Skotheim et al. |
| 7,273,682 B2 | 9/2007 | Park et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,645,543 B2 | 1/2010 | Visco et al. |
| 7,666,233 B2 | 2/2010 | Visco et al. |
| 7,824,806 B2 | 11/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 8,012,631 B2 | 9/2011 | Seino et al. |
| 8,048,570 B2 | 11/2011 | Visco et al. |
| 8,048,571 B2 | 11/2011 | Visco et al. |
| 8,088,697 B2 | 1/2012 | Yuh et al. |
| 8,092,941 B2 | 1/2012 | Weppner et al. |
| 8,114,171 B2 | 2/2012 | Visco et al. |
| 8,129,052 B2 | 3/2012 | Visco et al. |
| 8,182,943 B2 | 5/2012 | Visco et al. |
| 8,202,649 B2 | 6/2012 | Visco et al. |
| 8,293,398 B2 | 10/2012 | Visco et al. |
| 8,304,019 B1 | 11/2012 | Pichler |
| 8,304,115 B1 | 11/2012 | Petkov et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,404,388 B2 | 3/2013 | Visco et al. |
| 8,445,136 B2 | 5/2013 | Visco et al. |
| 8,455,131 B2 | 6/2013 | Visco et al. |
| 8,501,339 B2 | 8/2013 | Visco et al. |
| 8,556,197 B2 | 10/2013 | Hama et al. |
| 8,652,686 B2 | 2/2014 | Visco et al. |
| 8,658,304 B2 | 2/2014 | Visco et al. |
| 8,658,317 B2 | 2/2014 | Weppner et al. |
| 8,673,477 B2 | 3/2014 | Visco et al. |
| 8,691,444 B2 | 4/2014 | Visco et al. |
| 8,691,928 B2 | 4/2014 | Hsieh et al. |
| 8,778,522 B2 | 7/2014 | Visco et al. |
| 8,778,543 B2 | 7/2014 | Shinohara et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 8,923,360 B2 | 12/2014 | Coleman et al. |
| 9,077,041 B2 | 7/2015 | Burnside et al. |
| 9,123,941 B2 | 9/2015 | Visco et al. |
| 9,130,198 B2 | 9/2015 | Visco et al. |
| 9,136,568 B2 | 9/2015 | Visco et al. |
| 9,287,573 B2 | 3/2016 | Visco et al. |
| 9,321,652 B2 | 4/2016 | Paquette et al. |
| 9,362,538 B2 | 6/2016 | Visco et al. |
| 9,379,368 B2 | 6/2016 | Roumi |
| 9,598,769 B2 | 3/2017 | Elam et al. |
| 9,601,779 B2 | 3/2017 | Visco et al. |
| 9,660,265 B2 | 5/2017 | Visco et al. |
| 9,905,860 B2 | 2/2018 | Visco et al. |
| 10,147,968 B2 | 12/2018 | Visco et al. |
| 10,164,289 B2 | 12/2018 | Visco et al. |
| 10,601,071 B2 | 3/2020 | Visco et al. |
| 10,629,950 B2 | 4/2020 | Visco et al. |
| 10,707,536 B2 | 7/2020 | Visco et al. |
| 10,804,111 B2 * | 10/2020 | Hashimoto ....... H01L 21/30604 |
| 10,833,361 B2 | 11/2020 | Visco et al. |
| 10,840,546 B2 | 11/2020 | Visco et al. |
| 10,840,547 B2 | 11/2020 | Visco et al. |
| 10,862,171 B2 | 12/2020 | Visco et al. |
| 10,868,293 B2 | 12/2020 | Visco et al. |
| 10,916,753 B2 | 2/2021 | Visco et al. |
| 11,171,364 B2 | 11/2021 | Visco et al. |
| 11,174,190 B2 | 11/2021 | Valli et al. |
| 11,239,495 B2 | 2/2022 | Visco et al. |
| 11,444,270 B2 | 9/2022 | Visco et al. |
| 11,631,889 B2 | 4/2023 | Visco et al. |
| 11,646,444 B2 | 5/2023 | Visco et al. |
| 11,646,445 B2 | 5/2023 | Visco et al. |
| 11,749,834 B2 | 9/2023 | Visco et al. |
| 11,817,569 B2 | 11/2023 | Visco et al. |
| 11,876,174 B2 | 1/2024 | Visco et al. |
| 11,984,553 B2 | 5/2024 | Visco et al. |
| 12,021,187 B2 | 6/2024 | Visco et al. |

(56) References Cited

U.S. PATENT DOCUMENTS

| | | |
|---|---|---|
| 12,021,238 B2 | 6/2024 | Visco et al. |
| 12,034,116 B2 | 7/2024 | Visco et al. |
| 12,051,824 B2 | 7/2024 | Visco et al. |
| 12,183,880 B2 | 12/2024 | Visco et al. |
| 12,237,511 B2 | 2/2025 | Visco et al. |
| 12,294,050 B2 | 5/2025 | Visco et al. |
| 12,294,051 B2 | 5/2025 | Visco et al. |
| 2002/0004173 A1 | 1/2002 | Berkey et al. |
| 2002/0012846 A1 | 1/2002 | Skotheim et al. |
| 2002/0036131 A1 | 3/2002 | Kugai et al. |
| 2002/0182508 A1 | 12/2002 | Nimon et al. |
| 2003/0099884 A1 | 5/2003 | Chiang et al. |
| 2003/0134734 A1 | 7/2003 | Nishimoto et al. |
| 2004/0005504 A1 | 1/2004 | Kugai et al. |
| 2004/0200519 A1 | 10/2004 | Sterzel et al. |
| 2005/0063652 A1 | 3/2005 | Johnson et al. |
| 2005/0107239 A1 | 5/2005 | Akiba et al. |
| 2006/0222954 A1 | 10/2006 | Skotheim et al. |
| 2007/0037058 A1 | 2/2007 | Visco et al. |
| 2007/0059533 A1 | 3/2007 | Burdette et al. |
| 2007/0087269 A1 | 4/2007 | Inda |
| 2007/0119212 A1 | 5/2007 | Huang et al. |
| 2007/0148533 A1 | 6/2007 | Anglin et al. |
| 2007/0160911 A1 | 7/2007 | Senga et al. |
| 2007/0207186 A1 | 9/2007 | Scanlon et al. |
| 2007/0231704 A1 | 10/2007 | Inda |
| 2007/0248888 A1 | 10/2007 | Seino et al. |
| 2007/0271957 A1 | 11/2007 | Nakamura et al. |
| 2007/0281089 A1 | 12/2007 | Heller et al. |
| 2007/0295385 A1 | 12/2007 | Sheats et al. |
| 2008/0057386 A1 | 3/2008 | Visco et al. |
| 2008/0057399 A1 | 3/2008 | Visco et al. |
| 2008/0318132 A1 | 12/2008 | Visco et al. |
| 2009/0100874 A1 | 4/2009 | Tateishi et al. |
| 2009/0117460 A1 | 5/2009 | Isaacson et al. |
| 2009/0142669 A1 | 6/2009 | Shinohara et al. |
| 2009/0159839 A1 | 6/2009 | Seino et al. |
| 2009/0297935 A1 | 12/2009 | Visco et al. |
| 2010/0022378 A1 | 1/2010 | Nguyen et al. |
| 2010/0040952 A1 | 2/2010 | Kimura et al. |
| 2010/0075209 A1 | 3/2010 | Kimura et al. |
| 2010/0135706 A1 | 6/2010 | Miki et al. |
| 2010/0190063 A1 | 7/2010 | Fukumoto et al. |
| 2011/0065007 A1 | 3/2011 | Kamiya et al. |
| 2011/0076570 A1 | 3/2011 | Hama et al. |
| 2011/0108642 A1 | 5/2011 | Hama et al. |
| 2011/0117726 A1 | 5/2011 | Pinnington et al. |
| 2011/0269007 A1 | 11/2011 | Visco et al. |
| 2012/0034529 A1 | 2/2012 | Tatsumisago et al. |
| 2012/0058280 A1 | 3/2012 | Chung et al. |
| 2012/0077020 A1 | 3/2012 | Muramatsu et al. |
| 2012/0094188 A1 | 4/2012 | Visco et al. |
| 2012/0177997 A1 | 7/2012 | Nakamoto et al. |
| 2012/0183834 A1 | 7/2012 | Kanda et al. |
| 2012/0183880 A1 | 7/2012 | Toussaint et al. |
| 2012/0189918 A1 | 7/2012 | Tatsumisago et al. |
| 2012/0204601 A1 | 8/2012 | Murakami |
| 2012/0309157 A1 | 12/2012 | Iwamatsu et al. |
| 2012/0315482 A1 | 12/2012 | Muramatsu et al. |
| 2013/0164631 A1 | 6/2013 | Ohtomo et al. |
| 2013/0164632 A1 | 6/2013 | Kato et al. |
| 2013/0288134 A1 | 10/2013 | Hama et al. |
| 2013/0340827 A1 | 12/2013 | Watzke et al. |
| 2014/0072875 A1 | 3/2014 | Uchiyama |
| 2014/0084224 A1 | 3/2014 | Rittmeyer et al. |
| 2014/0090421 A1 | 4/2014 | Shock et al. |
| 2014/0093785 A1 | 4/2014 | Sugiura et al. |
| 2014/0141341 A1 | 5/2014 | Ohtomo et al. |
| 2014/0151371 A1 | 6/2014 | Chang et al. |
| 2014/0154586 A1 | 6/2014 | Hayashi et al. |
| 2014/0162108 A1 | 6/2014 | Visco et al. |
| 2014/0170465 A1 | 6/2014 | Visco et al. |
| 2014/0186785 A1 | 7/2014 | Mellen |
| 2014/0272524 A1 | 9/2014 | Visco et al. |
| 2014/0322584 A1 | 10/2014 | Visco et al. |
| 2014/0339194 A1 | 11/2014 | Gu et al. |
| 2015/0068251 A1 | 3/2015 | Ottermann et al. |
| 2015/0079481 A1 | 3/2015 | Sun et al. |
| 2015/0107510 A1 | 4/2015 | Lindfors |
| 2015/0138636 A1 | 5/2015 | O'Reilly et al. |
| 2015/0171431 A1 | 6/2015 | Yamada et al. |
| 2015/0214555 A1 | 7/2015 | Visco et al. |
| 2015/0291753 A1 | 10/2015 | Tsukamura et al. |
| 2015/0293347 A1 | 10/2015 | Kreit et al. |
| 2015/0340720 A1 | 11/2015 | Visco et al. |
| 2015/0344342 A1 | 12/2015 | Nguyen et al. |
| 2015/0349371 A1 | 12/2015 | Neudecker et al. |
| 2016/0028053 A1 | 1/2016 | Visco et al. |
| 2016/0028063 A1 | 1/2016 | Visco et al. |
| 2016/0072153 A1 | 3/2016 | Ichikawa et al. |
| 2016/0133989 A1 | 5/2016 | Suzuki et al. |
| 2016/0156065 A1 | 6/2016 | Visco et al. |
| 2016/0190640 A1 | 6/2016 | Visco et al. |
| 2016/0197326 A1 | 7/2016 | Visco et al. |
| 2016/0211547 A1 | 7/2016 | Hwang et al. |
| 2016/0218349 A1 | 7/2016 | Hasegawa et al. |
| 2016/0257593 A1 | 9/2016 | Nguyen et al. |
| 2016/0261002 A1 | 9/2016 | Trevey et al. |
| 2016/0351878 A1 | 12/2016 | Visco et al. |
| 2016/0351879 A1 | 12/2016 | Visco et al. |
| 2016/0351889 A1 | 12/2016 | Swonger et al. |
| 2017/0117549 A1 | 4/2017 | Hintennach |
| 2017/0229731 A1 | 8/2017 | Visco et al. |
| 2017/0288228 A1 | 10/2017 | Ito et al. |
| 2017/0309899 A1 | 10/2017 | Son et al. |
| 2017/0331156 A1 | 11/2017 | Visco et al. |
| 2017/0355632 A1 | 12/2017 | McEnroe et al. |
| 2017/0365853 A1 | 12/2017 | Visco et al. |
| 2018/0108909 A1 | 4/2018 | Su et al. |
| 2018/0131040 A1 | 5/2018 | Visco et al. |
| 2018/0201540 A1* | 7/2018 | Sheen .................. C03C 17/245 |
| 2018/0269527 A1 | 9/2018 | Minami |
| 2018/0309157 A1 | 10/2018 | Visco et al. |
| 2018/0337413 A1 | 11/2018 | Sassen et al. |
| 2019/0013546 A1 | 1/2019 | Visco et al. |
| 2019/0148768 A1 | 5/2019 | Visco et al. |
| 2019/0173128 A1 | 6/2019 | Visco et al. |
| 2019/0177878 A1 | 6/2019 | Kanatzidis et al. |
| 2019/0181496 A1 | 6/2019 | Visco et al. |
| 2019/0194052 A1 | 6/2019 | Nguyen et al. |
| 2019/0229370 A1 | 7/2019 | Visco et al. |
| 2019/0237801 A1 | 8/2019 | Kanno et al. |
| 2019/0237810 A1 | 8/2019 | Visco et al. |
| 2019/0241455 A1 | 8/2019 | Sweney et al. |
| 2019/0276356 A1* | 9/2019 | Abbott .................. C03C 19/00 |
| 2019/0305370 A1 | 10/2019 | Minamida |
| 2019/0321921 A1* | 10/2019 | Paris ...................... H01L 23/15 |
| 2020/0014063 A1 | 1/2020 | Visco et al. |
| 2020/0028209 A1 | 1/2020 | Visco et al. |
| 2020/0123038 A1 | 4/2020 | Jud et al. |
| 2020/0127275 A1 | 4/2020 | Visco et al. |
| 2020/0243902 A1 | 7/2020 | Visco et al. |
| 2020/0251773 A1 | 8/2020 | Visco et al. |
| 2020/0395633 A1 | 12/2020 | Visco et al. |
| 2021/0098818 A1 | 4/2021 | Visco et al. |
| 2021/0098819 A1 | 4/2021 | Visco et al. |
| 2021/0111427 A1 | 4/2021 | Visco et al. |
| 2021/0126236 A1 | 4/2021 | Visco et al. |
| 2021/0218005 A1 | 7/2021 | Matzner et al. |
| 2021/0218055 A1 | 7/2021 | Visco et al. |
| 2021/0320328 A1 | 10/2021 | Visco et al. |
| 2021/0340048 A1 | 11/2021 | Visco et al. |
| 2021/0380456 A1 | 12/2021 | Visco et al. |
| 2021/0381115 A1 | 12/2021 | Kang et al. |
| 2021/0395128 A1 | 12/2021 | Visco et al. |
| 2022/0013857 A1 | 1/2022 | Visco et al. |
| 2022/0045328 A1 | 2/2022 | Visco et al. |
| 2022/0045352 A1 | 2/2022 | Visco et al. |
| 2022/0045353 A1* | 2/2022 | Visco ...................... C03C 4/14 |
| 2022/0216509 A1 | 7/2022 | Sasaki et al. |
| 2022/0263137 A1 | 8/2022 | Visco et al. |
| 2022/0302492 A1 | 9/2022 | Visco et al. |
| 2022/0320573 A1 | 10/2022 | Visco et al. |
| 2022/0320579 A1 | 10/2022 | Visco et al. |

(56) References Cited

U.S. PATENT DOCUMENTS

| | | | |
|---|---|---|---|
| 2022/0328865 | A1 | 10/2022 | Visco et al. |
| 2022/0328866 | A1 | 10/2022 | Visco et al. |
| 2022/0336849 | A1 | 10/2022 | Visco et al. |
| 2022/0396516 | A1 | 12/2022 | Visco et al. |
| 2022/0399567 | A1 | 12/2022 | Visco et al. |
| 2023/0091921 | A1 | 3/2023 | Visco et al. |
| 2023/0098257 | A1 | 3/2023 | Visco et al. |
| 2023/0299336 | A1 | 9/2023 | Visco et al. |
| 2023/0335786 | A1 | 10/2023 | Visco et al. |
| 2023/0335789 | A1 | 10/2023 | Visco et al. |
| 2023/0420634 | A1 | 12/2023 | Visco et al. |
| 2024/0088359 | A1 | 3/2024 | Visco et al. |
| 2024/0088433 | A1 | 3/2024 | Visco et al. |
| 2024/0092676 | A1 | 3/2024 | Visco et al. |
| 2024/0283011 | A1 | 8/2024 | Visco et al. |
| 2024/0347731 | A1 | 10/2024 | Visco et al. |
| 2024/0347764 | A1 | 10/2024 | Visco et al. |
| 2024/0363895 | A1 | 10/2024 | Visco et al. |
| 2024/0405263 | A1 | 12/2024 | Visco et al. |
| 2024/0429404 | A1 | 12/2024 | Visco et al. |
| 2025/0006984 | A1 | 1/2025 | Visco et al. |
| 2025/0174665 | A1 | 5/2025 | Visco et al. |

FOREIGN PATENT DOCUMENTS

| | | |
|---|---|---|
| CN | 101346424 A | 1/2009 |
| CN | 101494299 A | 7/2009 |
| CN | 101535039 A | 9/2009 |
| EP | 0774654 B1 | 1/2000 |
| EP | 3227952 A1 | 10/2017 |
| JP | 2004063419 A | 2/2004 |
| JP | 2004127743 A | 4/2004 |
| JP | 2007311084 A | 11/2007 |
| JP | 2008103229 A | 5/2008 |
| JP | 2008103258 A | 5/2008 |
| JP | 2008300300 A | 12/2008 |
| JP | 2009158476 A | 7/2009 |
| JP | 2009252670 A | 10/2009 |
| JP | 2010108881 A | 5/2010 |
| JP | 2010123463 A | 6/2010 |
| JP | 2012043654 A | 3/2012 |
| JP | 2012089244 A | 5/2012 |
| JP | 2012089424 A | 5/2012 |
| JP | 2012096973 A | 5/2012 |
| JP | 2013117398 A | 6/2013 |
| JP | 2013232335 A | 11/2013 |
| JP | 2014035989 A | 2/2014 |
| JP | 2014096311 A | 5/2014 |
| JP | 2014127272 A | 7/2014 |
| JP | 2014221714 A | 11/2014 |
| KR | 20140011258 A | 1/2014 |
| WO | WO-9801401 A1 | 1/1998 |
| WO | WO-2009003695 A2 | 1/2009 |
| WO | WO-2009094524 A1 | 7/2009 |
| WO | WO-2012017544 A1 | 2/2012 |
| WO | WO-2013141481 A1 | 9/2013 |
| WO | WO-2016089897 A1 | 6/2016 |
| WO | WO-2016089899 A1 | 6/2016 |
| WO | WO-2017112550 A1 | 6/2017 |
| WO | WO-2017197039 A1 | 11/2017 |
| WO | WO-2018141919 A1 | 8/2018 |
| WO | WO-2019010047 A1 | 1/2019 |
| WO | WO-2019018386 A1 | 1/2019 |
| WO | WO-2019121340 A1 | 6/2019 |
| WO | WO-2019204244 A1 | 10/2019 |

OTHER PUBLICATIONS

Bartholomew, Roger F. et al., "Electrical properties of new glasses based on the Li2S—SiS2 system," Journal of Non-Crystalline Solids 256&257 (1999) 242-247.
Bates, J.B. et al., "Electrical properties of amorphous lithium electrolyte thin films," 1992, Solid State Ionics.
Bates, J.B. et al., "Thin-film rechargeable lithium batteries," 1995, Journal of Power Sources.
Bertschler, Eva-Maria et al., "Li+ Ion Conductors with Adamantane-Type Nitridophosphate Anions β-Li10P4N10 and Li13P4N10X3 with X=Cl, Br", Chemistry: A European Journal, vol. 24, Issue 1, (Jan. 2, 2018), pp. 196-205.
BR Office Action dated Aug. 3, 2022, in Application No. BR112017011768-1 awaiting English translation.
BR Office Action dated Aug. 3, 2022, in Application No. BR112017011768-1.
BR Office Action dated Mar. 28, 2022 in Application No. BR20171111548 with English translation.
BR Office Action dated Mar. 28, 2022 in Application No. BR20171111768 with English translation.
Burckhardt, W. et al., "Fast Li+ ion transport in iodine-thioborate glasses," Mat. Res. Bull., vol. 19, pp. 1083-1089, 1984.
CA Office Action dated May 31, 2022, in Application No. CA2969113.
CA Office Action dated Oct. 7, 2021, in application No. CA2,969,117.
Cao, C. et al., "Recent advances in inorganic solid electrolytes for lithium batteries," Frontiers in Energy Research, Jun. 27, 2014, vol. 2, No. 25, pp. 1-10.
CN Office Action dated Feb. 3, 2019, CN Application No. 201580075233.0 with English Translation.
Communication Pursuant to Article 94(3) EPC, First Office Action, dated May 13, 2019, for European Patent Application No. 15864779.2.
Communication Pursuant to Rules 161(2) and 162 EPC, (request for extra claims fees), dated Aug. 4, 2017, for European Patent Application No. 15864779.2.
Communication Pursuant to Rules 70(2) and 70a(2), dated Jun. 8, 2018, deadline for response to Extended European Search Report, for European Patent Application No. 15864779.2.
Decision for Grant, dated Sep. 29, 2020, for Japanese Patent Application No. 2017- 529785, with translation.
EP Search Report dated Dec. 22, 2021, in Application No. EP21183687.9.
Examination Report, dated Sep. 14, 2020, for European Patent Application No. 15864779.2, 3 Pages.
Extended European Search Report, dated May 22, 2018, for European Patent Application No. 15864779.2.
Final Office Action for U.S. Appl. No. 15/726,302, dated Dec. 30, 2020.
Final Office Action for U.S. Appl. No. 15/929,959, dated Apr. 29, 2021.
First Office Action, dated Dec. 15, 2020, for Canadian Patent Application No. 2,969,113.
First Office Action, dated Jan. 14, 2020, for Brazilian Patent Application No. BR112017011548-4, with English Translation.
First Office Action, dated Jan. 14, 2020, for Brazilian Patent Application No. BR112017011768-1, with English Translation.
First Office Action, dated May 10, 2021, for Canadian Patent Application No. 2,969,117.
Flexible Graphite Foil as viewed at https://hpmsgraphite.com/graphitefoil using the Wayback machine (Year: 2004).
Flexible Graphite Foil as viewed at https://hpmsgraphite.com/graphitefoil via the Wayback archive (Year: 2018).
Fu, Jie, "Fast Li+ ion conducting glass-ceramics in the system Li2O—Al2O3—GeO2—P2O5" Solid State Ionics 104 (1997), pp. 191-194.
Fu, Jie, "Fast Li+ Ion Conduction in Li2O—Al2O3—TiO2—SiO2—P2O5 Glass-Ceramics," Journal of the American Ceramics Society, vol. 80, No. 7, Jul. 1997, pp. 1-5.
Fu, Jie, "Superionic conductivity of glass-ceramics in the system Li2O—Al2O3—TiO3—P2O5", Solid State Ionics 96 (1997), pp. 195-200.
Geiss, M. "Sacrificial Interlayers for All-solid-state Batteries", Aug. 14, 2020, pp. 243.
George, S.M., "Atomic layer deposition: an overview", Chemical reviews, (Jan. 13, 2010), 110(1):111-31.
Hayashi, A. et al., "Preparation of $Li_2S—P_2S_5$ Amorphous Solid Electrolytes by Mechanical Milling," Journal of American Ceramic Society, Feb. 28, 2001, vol. 84, No. 2, pp. 477-479.

(56) References Cited

OTHER PUBLICATIONS

Hayashi, Akitoshi et al., "Characterization of Li2S—P2S5 glass-ceramics as a solid electrolyte for lithium secondary batteries," Solid State Ionics 175 (2004) 683-686.

Hayashi, Akitoshi et al., "Formation of superionic crystals from mechanically milled Li2S—P2S5 glasses," Electrochemistry Communications 5 (2003) 111-114, Nov. 26, 2002.

Hayashi, Akitoshi et al., "Mechanochemical synthesis of amorphous solid electrolytes using SiS2 and various lithium compounds," Solid State Ionics 175 (2004) 637-640, Dec. 9, 2003.

Hayashi, Akitoshi et al., "Preparation and ionic conductivity of Li7P3S11-z glass-ceramic electrolytes," Journal of Non-Crystalline Solids 356 (2010) 2670-2673.

Hirota, Yukihiro and Osamu Mikami, "Energy Barrier Height Measurements of Chemically Vapour Deposited, P3N5 Films by Internal Photoinjection", Thin Solid Films, vol. 162, (Aug. 1988), pp. 41-47.

Hoffman, E. E., "Solubility of Nitrogen and Oxygen in Lithium and Methods of Lithium Purification," in Symposium on Newer Metals, ed. R. Jaffee (West Conshohocken, PA: ASTM International, 1960), 195-206. https://doi.org/10.1520/STP46339S.

HPMS HP Materials Solutions Inc., "Flexible Graphite Foil", The Wayback Machine, 2021, pp. 1-7.

Johnson, R.W., Hultqvist, A., Bent, S.F., "A brief review of atomic layer deposition: from fundamentals to applications", Materials today, (Jun. 1, 2014), 17(5):236-46.

Jones, Steven D. et al., "A thin-film solid-state microbattery," Journal of Power Sources, 43-44 (1993) 505-513.

JP Notice of Reasons for Rejection dated Oct. 5, 2021, in application No. JP20200181662 with English translation.

JP Office Action dated Jan. 4, 2023, in Application No. JP2020-181662 with English translation.

JP Office Action dated May 31, 2022, in Application No. JP2020-181662 with English translation.

Kanno, R. and M. Murayama, "Lithium ionic conductor thio-LISICON: the Li2 S GeS2 P 2 S 5 system", Journal of the electrochemical society, (Jun. 5, 2001), 148(7):A742.

Kato, A. et al., "High-Temperature Performance of All-Solid-State Lithium-Metal Batteries Having Li/Li3PS4 Interfaces Modified with Au Thin Films", Journal of The Electrochemical Society, 2018, vol. 165, No. 9, pp. A1950-A1954.

Kennedy, J.H., "Ionically conductive glasses based on SiS2," Materials Chemistry and Physics, 23 (1989) 29-50.

Kennedy, John H. et al., "Improved stability for the SiS2-P2S5-Li2S-LiI glass system," Solid State Ionics 28-30 (1998) 726-728.

Kennedy, John H. et al., "Ionically conductive sulfide-based lithium glasses," Journal of Non-Crystalline Solids 123 (1990) 328-338.

Kennedy, John H. et al., "Preparation and conductivity measurements of SiS2—Li2S glasses doped with LiBr and LiC1," Solid State Ionics 18 & 19 (1986) 368-371.

Kitaura, Hirokazu et al., "Fabrication of electrode-electrolyte interfaces in all-solid-state rechargeable lithium batteries by using a supercooled liquid state of the glassy electrolytes," J. Mater. Chem., 2011, 21, 118.

Kondo, S. et al., "New lithium ion conductors based on Li2S—SiS2 system," Solid State Ionics 53-56 (1992) 1183-1186.

KR Office Action dated Jun. 23, 2022 in Application No. KR10-2017-7018176 with English translation.

KR Office Action dated Nov. 23, 2023, in KR Application No. 10-2023-7010384 with English translation.

Lau, J., et al., "Sulfide Solid Electrolytes for Lithium Battery Applications," Advanced Energy Materials, 2018, vol. 8, pp. 1-24.

Levason, Bill and Andrew L. Hector (eds.), "Chemistry and Applications of Metal Nitrides," (Preface only), Coordinated Chemistry Reviews, vol. 257, Issues 13-14, (Jul. 2013), p. 1945.

Li, Xuemin et al., "Facile Synthesis of Lithium Sulfide Nanocrystals for Use in Advanced Rechargeable Batteries", ACS Appl. Mater. Interfaces, (Dec. 3, 2015), 7, 51, 28444-28451.

Maier-Komor, P., "Preparation of Phosphorus Targets Using the Compound Phosphorus Nitride", Nuclear Instruments and Methods in Physics Research Section A: Accelerators, Spectrometers, Detectors and Associated Equipment, vol. 257, Issue 1, (Jun. 1, 1987), pp. 1-3.

Malugani, J.P. et al., "Preparation and electrical properties of the 0,37 Li2S-0,18P2S5-0,45 LiI glass," Solid State Ionics 1 (1980) 519-523.

Mercier, René et al., "Superionic conduction in Li2S-P2S5-LiI—glasses," Solid State Ionics. (Oct. 1981) 5:663-666.

Mexican Office Action dated Oct. 20, 2022 issued in Application No. MX/a/2017/007265 with English translation.

Minami, Keiichi et al., "Electical and electrochemical properties of glass-ceramic electrolytes in the systems Li2S—P2S5—P2S3 and Li2S—P2S5—P2O5," Solid State Ionics 192 (2011) 122-125.

Minami, Keiichi et al., "Mechanochemical synthesis of Li2S—P2S5 glass electrolytes with lithium salts," Solid State Ionics 181 (2010) 1505-1509.

Minami, Keiichi et al., "Preparation and characterization of lithium ion conducting Li2S—P2S5—GeS2 glasses and glass-ceramics," Journal of Non-Crystalline Solids 356 (2010) 2666-2669.

Minami, Tsutomu et al., "Preparation and characterization of lithium ion-conducting oxysulfide glasses," Solid State Ionics 136-137 (2000) 1015-1023.

Mizuno, F., et al. "High lithium ion conducting glass-ceramics in the system Li2S—P2S5", Solid State Ionics, (Oct. 31, 2006), 177(26-32):2721-5.

Mizuno, Fuminori et al., "All Solid-state Lithium Secondary Batteries Using High Lithium Ion Conducting Li2S—P2S5 Glass-Ceramics", Chemistry Letters 2002, No. 12, The Chemical Society of Japan, (Dec. 5, 2002), 31(12):1244-1245 (with 2 cover pages).

Mizuno, Fuminori et al., "Lithium ion conducting solid electrolytes prepared from Li2S, elemental P and S," Solid State Ionics 177 (2006) 2753-2757.

Mizuno, Fuminori et al., "New, highly Ion-Conductive Crystals Precipitated from Li2S—P2S5 Glasses", Advanced Materials, (Apr. 4, 2005), 17(7):918-21.

Murayama, M., et al., "Material design of new lithium ionic conductor, thio-LISICON, in the Li2S—P2S5 system", Solid State Ionics, (May 31, 2004), 170(3-4):173-80.

Non-Final Office Action for U.S. Appl. No. 14/954,812, dated Aug. 1, 2018.

Non-Final Office Action for U.S. Appl. No. 14/954,816, dated Aug. 1, 2018.

Non-final Office Action for U.S. Appl. No. 15/726,302, dated Apr. 16, 2020.

Non-final Office Action for U.S. Appl. No. 15/726,302, dated Sep. 10, 2021.

Non-final Office Action for U.S. Appl. No. 16/161,720, dated Apr. 28, 2020.

Non-Final Office Action for U.S. Appl. No. 16/174,058, dated Sep. 17, 2021.

Non-final Office Action for U.S. Appl. No. 16/179,803, dated Apr. 28, 2020.

Non-final Office Actions for U.S. Appl. No. 15/380,989, dated Mar. 26, 2019.

Notice of Allowance, dated Mar. 10, 2020, for Chinese Patent Application No. 201580075233.0, with English Translation.

Notice of Allowance dated Oct. 1, 2021, in U.S. Appl. No. 16/781,713.

Notice of Allowance for U.S. Appl. No. 14/954,812, dated Oct. 30, 2018.

Notice of Allowance for U.S. Appl. No. 14/954,816, dated Oct. 15, 2018.

Notice of Allowance for U.S. Appl. No. 15/380,989, dated Dec. 6, 2019.

Notice of Allowance for U.S. Appl. No. 16/012,588, dated Dec. 3, 2019.

Notice of Allowance for U.S. Appl. No. 16/161,720, dated Aug. 6, 2020.

Notice of Allowance for U.S. Appl. No. 16/179,803, dated Aug. 11, 2020.

Notice of Allowance for U.S. Appl. No. 16/341,872, dated Aug. 21, 2020.

Notice of Allowance for U.S. Appl. No. 16/341,874, dated Sep. 3, 2020.

(56) References Cited

OTHER PUBLICATIONS

Notice of Allowance for U.S. Appl. No. 16/663,177, dated Sep. 3, 2020.
Notice of Allowance for U.S. Appl. No. 15/929,959, dated Aug. 4, 2021.
Notice of Allowance for U.S. Appl. No. 15/929,959, dated Jul. 12, 2021.
Notice of Intention to Grant, dated Jan. 26, 2021, for European Patent Application No. 15864779.2, 7 Pages.
Notice of Reasons for Rejection, dated Jan. 14, 2020, for Japanese Patent Application No. 2017-529785, with machine translation.
Notice of Reasons for Rejection, dated May 24, 2019, for Japanese Patent Application No. 2017-529785, with machine translation.
Ohtomo, Takamasa et al., "All-solid-state lithium secondary batteries using the 75Li2S•25P2S5glass and the 70Li2S•30P2S5 glass-ceramic as solid electrolytes," Journal of Power Sources 233 (2013) 231-235.
Ohtomo, Takamasa et al., "Electrical and electrochemical properties of Li2S—P2S5—P2—O5 glass-ceramic electrolytes," Journal of Power Sources 146 (2005) 715-718.
Ohtomo, Takamasa et al., "Mechanochemical synthesis of lithium ion conducting glasses and glass-ceramics in the system Li2S—P—S," Solid State Ionics 176 (2005) 2349-2353.
Panasonic Industry "PGS" Graphite Sheets as viewed at 2021.
Park., 2013.—(machine translation), 13 pages.
Pradel, A., et al., "Lithium Chalcogenide Conductive glasses," Materials Chemistry and Physics, 1989, vol. 23, pp. 121-142.
Pradel, Annie et al., "Electrical properties of lithium conductive silicon sulfide glasses prepared by twin roller quenching," Solid State Ionics 18 & 19 (1986) 351-355.
Restriction Requirement for U.S. Appl. No. 15/380,989, dated Jul. 5, 2018.
Restriction Requirement for U.S. Appl. No. 15/726,302, dated May 6, 2019.
Restriction Requirement for U.S. Appl. No. 15/726,302, dated Nov. 19, 2019.
Restriction Requirement for U.S. Appl. No. 16/174,058, dated Apr. 16, 2020.
Rudolph, B. et al., "Cyclic voltammetry studies ofthe lithiumthioborate glass-indium interface," Electrochimica Acta, vol. 34, No. 11, pp. 1519-1521, 1989.
Sahami, Saeed et al., "Preparation and conductivity measurements of SiS2—Li2S—LiBr lithium ion conductive glasses," Journal of the Electrochemical Society,Apr. 1985, pp. 985-986.
Sakuda, Atsushi et al., "Sulfide solid electrolyte with favorable mechanical property for all-solid-state lithium battery," Scientific Reports 32261, Jul. 23, 2013.
Sandfire Scientific, "Quartz Ampoules Coated with Layer of Pyrolyzed Carbon," 2015, pp. 1-2. https://sandfire.com/quartz-ampoules-coated-with-layer-of-pyrolyzed-carbon/.
Second Office Action, dated Nov. 15, 2019, for Chinese Patent Application No. 201580075233.0, with English Translation.
Senevirathne, K. et al., "A New Crystalline LiPON Electrolyte: Synthesis, Properties, and Electronic Structure", Solid State Ionics, Feb. 21, 2013, vol. 233, pp. 95-101.
Svensson PH, Kloo L. Synthesis, structure, and bonding in polyiodide and metal iodide—iodine systems. Chemical Reviews. (Mar. 22, 2003), 103(5):1649-84.
Tatsumisago, M., et al., "Superionic conduction in rapidly quenched Li2S—SiS2—Li3PO4 glasses", Journal ofthe Ceramic Society of Japan, (Nov. 1, 1993), 101(1179):1315-7.
Tatsumisago, Masahiro et al., "Preparation and structure of lithium-ion-conducting mixed-anion glasses in the system LiBO2—LiBS2," J. Am. Ceram. Soc., 71 [9] 766-69 (1988).
Tatsumisago, Masahiro et al., "Recent development of sulfide solid electrolytes and interfacial modification for all-solid-state recharge-able lithium batteries," Journal of Asian Ceramic Societies 1 (2013) 17-25.
Tatsumisago, Masahiro, "Glassy materials based on Li2S for all-solid-state lithium secondary batteries," Solid State Ionics 175 (2004) 13-18.
Thangadurai, V. et al., "Novel fast lithium ion conduction in garnet-type $Li_5La_3M_2O_{12}$ (M=Nb, Ta)", Journal of the American Ceramic Society, Mar. 2003, vol. 86, No. 3, pp. 437-440.
Trevey, James et al., "Glass-ceramic Li2S—P2S5 electrolytes pre-pared by a single step ball billing process and their appliction for all-solid-state lithium-ion batteries," Electrochemistry Communications 11 (2009) 1830-1833.
U.S. Restriction Requirement dated Aug. 31, 2022 in U.S. Appl. No. 16/949,026.
U.S. Corrected Notice of Allowance dated Jun. 13, 2022, in U.S. Appl. No. 16/948,863.
U.S. Corrected Notice of Allowance dated May 16, 2024 in U.S. Appl. No. 17/303,707.
U.S. Corrected Notice of Allowance dated Sep. 20, 2023, in U.S. Appl. No. 18/175,374.
U.S. Final Office Action dated Jan. 16, 2024 in U.S. Appl. No. 17/243,429.
U.S. Final Office Action dated Mar. 6, 2023 in U.S. Appl. No. 16/948,835.
U.S. Final office Action dated Oct. 6, 2023 in U.S. Appl. No. 16/556,736.
U.S. Final Office Action dated Oct. 27, 2023 in U.S. Appl. No. 16/949,026.
U.S. Non Final Office Action dated Feb. 2, 2023 in U.S. Appl. No. 16/949,026.
U.S. Non Final Office Action dated Mar. 31,2023 for U.S. Appl. No. 16/556,736.
U.S. Non-Final office Action dated Oct. 27, 2022 in U.S. Appl. No. 16/948,835.
U.S. Non-Final Office Action dated Apr. 11,2023 in U.S. Appl. No. 17/303,707.
U.S. Non-Final Office Action dated Aug. 18, 2023, in U.S. Appl. No. 17/303,706.
U.S. Non-Final Office Action dated Dec. 4, 2023 in U.S. Appl. No. 17/302,027.
U.S. Non-Final Office Action dated Dec. 7, 2023 in U.S. Appl. No. 17/303,708.
U.S. Non-Final Office Action dated Dec. 23, 2022 in U.S. Appl. No. 16/784,162.
U.S. Non-Final Office Action dated Jan. 5, 2024 in U.S. Appl. No. 17/453,033.
U.S. Non-Final Office Action dated Jun. 7, 2023, in U.S. Appl. No. 17/243,429.
U.S. Non-Final Office Action dated Mar. 14, 2024 in U.S. Appl. No. 17/301,453.
U.S. Non-Final Office Action dated Nov. 18, 2022, in U.S. Appl. No. 16/948,836.
U.S. Notice of Allowance dated May 12, 2022, in U.S. Appl. No. 16/948,863.
U.S. Notice of Allowance dated Apr. 15, 2024 in U.S. Appl. No. 17/303,706.
U.S. Notice of allowance dated Dec. 9, 2022 in U.S. Appl. No. 17/248,225.
U.S. Notice of Allowance dated Feb. 15, 2024 in U.S. Appl. No. 16/721,787.
U.S. Notice of Allowance dated Jan. 9, 2023 in U.S. Appl. No. 16/948,836.
U.S. Notice of Allowance dated Jan. 19, 2023 in U.S. Appl. No. 16/948,836.
U.S. Notice of Allowance dated Jan. 30, 2024 in U.S. Appl. No. 16/721,787.
U.S. Notice of Allowance dated Jun. 6, 2024 in U.S. Appl. No. 17/303,706.
U.S. Notice of Allowance dated Jun. 20, 2023 in U.S. Appl. No. 16/509,385.
U.S. Notice of Allowance dated Mar. 15, 2023 in U.S. Appl. No. 16/948,835.
U.S. Notice of Allowance dated Mar. 20, 2023 in U.S. Appl. No. 17/817,494.

(56) References Cited

OTHER PUBLICATIONS

U.S. Notice of Allowance dated Mar. 27, 2024 in U.S. Appl. No. 17/302,491.
U.S. Notice of Allowance dated May 8, 2024 in U.S. Appl. No. 17/303,707.
U.S. Notice of Allowance dated May 8, 2024 in U.S. Appl. No. 17/303,708.
US Notice of Allowance dated Oct. 20, 2021, in U.S. Appl. No. 16/781,713.
U.S. Notice of Allowance dated Sep. 12, 2023 in U.S. Appl. No. 18/175,374.
U.S. Appl. No. 16/948,864, inventors Visco et al., filed Oct. 2, 2020.
U.S. Appl. No. 17/934,470, inventors Visco et al., filed Sep. 22, 2022.
U.S. Appl. No. 18/048,400, inventors Visco et al., filed Oct. 20, 2022.
U.S. Appl. No. 18/149,524, inventors Visco et al., filed Jan. 3, 2023.
U.S. Appl. No. 18/175,374, inventors Visco et al., filed Feb. 27, 2023.
U.S. Appl. No. 18/529,777, inventors Visco S J, et al., filed Dec. 5, 2023.
U.S. Appl. No. 18/590,753, inventor Visco S, filed Feb. 28, 2024.
U.S. Appl. No. 18/645,270, inventors Visco S.J, et al., filed Apr. 24, 2024.
U.S. Appl. No. 18/671,772, inventor Visco S, filed May 22, 2024.
U.S. Appl. No. 18/671,779, inventor Visco S, filed May 22, 2024.
U.S. Restriction requirement dated Apr. 3, 2023 in U.S. Appl. No. 17/303,706.
U.S. Restriction Requirement dated Dec. 23, 2022 in U.S. Appl. No. 16/556,736.
U.S. Restriction Requirement dated Jan. 18, 2023 in U.S. Appl. No. 17/303,707.
U.S. Restriction requirement dated May 18, 2023, in U.S. Appl. No. 16/721,787.
U.S. Restriction Requirement dated Nov. 3, 2022 in U.S. Appl. No. 16/509,385.
Visco, Steven J. et al., "Complex plane and 7Li NMR studies of arsenic sulfide-based lithium glasses," J. Electrochem. Soc.: Solid-State Science and Technology, Jul. 1985, pp. 1766-1770.
Visco, Steven J. et al., "Complex plane and 7Li NMR studies of highly conductive sulfide-based lithium glasses," Battery Testing, vol. 132, No. 4, pp. 751-753.
Wada, H., et al., "Preparation and ionic conductivity of new B2S3-Li2S-LiI glasses", Materials research bulletin, (Feb. 1, 1983), 18(2):189-93.
Wenzel, Sebastian et al., "Interphase formation and degradation of charge transfer kinetics between a lithium metal anode and highly crystalline Li7P3S11 solid electrolyte", Solid State Ionics, (Mar. 1, 2016), 286:24-33.
Wikipedia., "Sintering", The Free Encyclopedia, 2023, pp. 1-15.
WO patent application No. PCT/US2015/063231, International Search Report and Written Opinion mailed Mar. 11, 2016.
WO patent application No. PCT/US2015/063234, International Search Report and Written Opinion mailed Apr. 1, 2016.
WO patent application No. PCT/US2016/067338, International Preliminary Report on Patentability, dated mailed Jul. 5, 2018.
WO patent application No. PCT/US2016/067338, International Search Report and Written Opinion mailed May 19, 2017.
WO patent application No. PCT/US2018/039862, International Search Report and Written Opinion mailed Oct. 19, 2018.
WO patent application No. PCT/US2018/039862, Invitation to Pay Additional Fees and, where applicable, Protest Fee, dated Aug. 28, 2018.
WO patent application No. PCT/US2018/042476, Invitation to Pay Additional Fees and, where applicable, Protest Fee, dated Sep. 12, 2018.
Yang, M. et al., "Membranes in lithium ion batteries," Membranes, Jul. 4, 2012, vol. 2, pp. 367-383.

Annika B., et al., "Lithium-Ion Conducting Thin-Films for Solid-State Batteries prepared by Chemical Solution Deposition," Justus-Liebig-Universitat Gieen, 2018, 190 Pages.
Ko, Y., et al., "Influence of Process Conditions on Structural and Electrochemical Properties of Lithium Phosphorus Oxynitride Thin Films," Ceramics International, 2020, vol. 46, pp. 20623-20632.
Liu G., et al., "Highly Selective Lithium Recovery from High Mg/Li Ratio Brines," Desalination, Jan. 2020, vol. 474, pp. 1-7.
Lopez-Aranguren, P., et al., "Crystalline Li PON as a Bulk-Type Solid Electrolyte," ACS Energy Letters, 2021, vol. 6 (2), pp. 445-450.
Mascaraque, N., et al., "Structure and Electrical Properties of a New Thin-phosphorus Oxynitride Glass Electrolyte," Journal of Non-Crystalline Solids, 2014, vol. 405, pp. 159-162.
Trim-Lok., "Plastic Trims & Edge Guards," Trim-Lok, Inc., Jan. 2015, pp. 1-5.
U.S. Corrected Notice of Allowance dated Apr. 1, 2025 in U.S. Appl. No. 17/654,648.
U.S. Corrected Notice of Allowance dated Mar. 17, 2025 in U.S. Appl. No. 17/249,864.
U.S. Final Office Action dated Jul. 29, 2024 in U.S. Appl. No. 17/453,033.
U.S. Final Office Action dated May 6, 2025 in U.S. Appl. No. 17/649,550.
U.S. Non-Final Office Action dated Apr. 15, 2025 in U.S. Appl. No. 17/934,470.
U.S. Non-Final Office Action dated Aug. 19, 2024 in U.S. Appl. No. 17/658,646.
U.S. Non-Final Office Action dated Dec. 6, 2024 in U.S. Appl. No. 18/671,772.
U.S. Non-Final Office Action dated Dec. 18, 2024 in U.S. Appl. No. 17/650,770.
U.S. Non-Final Office Action dated Dec. 27, 2024 in U.S. Appl. No. 17/658,645.
U.S. Non-Final Office Action dated Feb. 13, 2025 in U.S. Appl. No. 18/671,779.
U.S. Non-Final Office Action dated Jan. 10, 2025 in U.S. Appl. No. 17/648,120.
U.S. Non-Final Office Action dated Mar. 14, 2025 in U.S. Appl. No. 18/048,400.
U.S. Non-Final Office Action dated Mar. 18, 2025 in U.S. Appl. No. 17/654,233.
U.S. Non-Final Office Action dated Mar. 18, 2025 in U.S. Appl. No. 17/813,463.
US Non-Final Office Action dated May 6, 2025 in U.S. Appl. No. 18/463,206.
U.S. Non-Final Office Action dated Nov. 14, 2024 in U.S. Appl. No. 17/658,639.
U.S. Non-Final Office Action dated Oct. 23, 2024 in U.S. Appl. No. 18/333,282.
U.S. Non-Final Office Action dated Oct. 31, 2024 in U.S. Appl. No. 17/649,550.
U.S. Notice of Allowance dated Apr. 30, 2025 in U.S. Appl. No. 18/671,779.
U.S. Notice of Allowance dated Jan. 15, 2025 in U.S. Appl. No. 18/671,772.
U.S. Notice of Allowance dated Mar. 11, 2025 in U.S. Appl. No. 17/249,864.
U.S. Notice of Allowance dated Mar. 12, 2025 in U.S. Appl. No. 17/654,648.
U.S. Notice of Allowance dated Oct. 17, 2024 in U.S. Appl. No. 18/191,615.
U.S. Appl. No. 19/024,530, inventors Visco S.J et al., filed Jan. 16, 2025.
U.S. Appl. No. 19/092,848, inventors Visco S.J et al., filed Mar. 27, 2025.
U.S. Restriction Requirement dated Apr. 24, 2025 in U.S. Appl. No. 17/816,592.

* cited by examiner

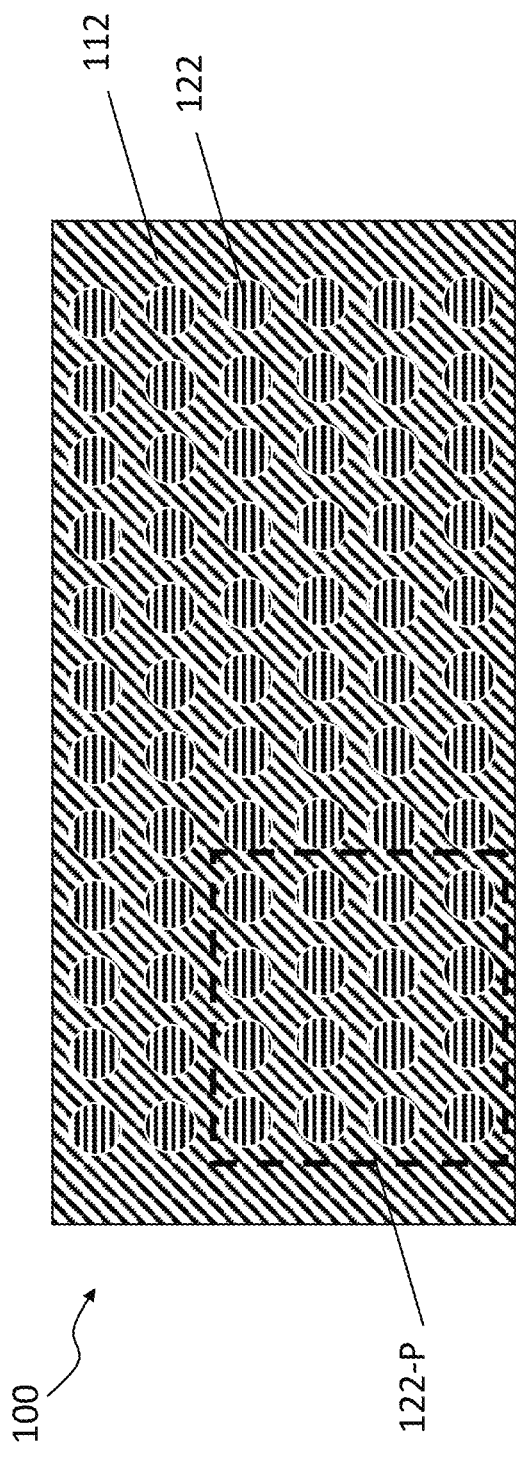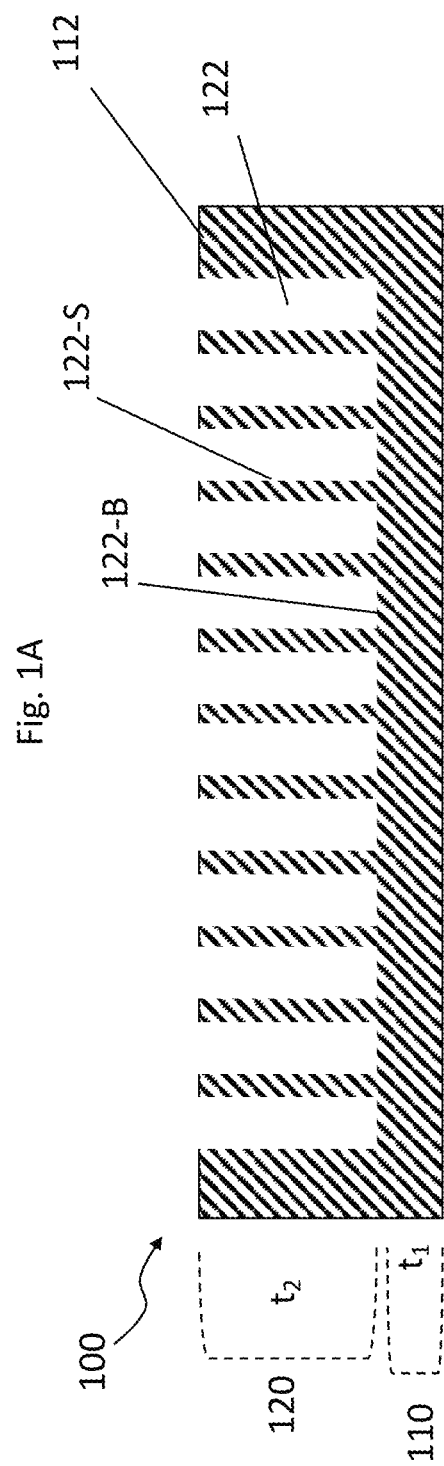

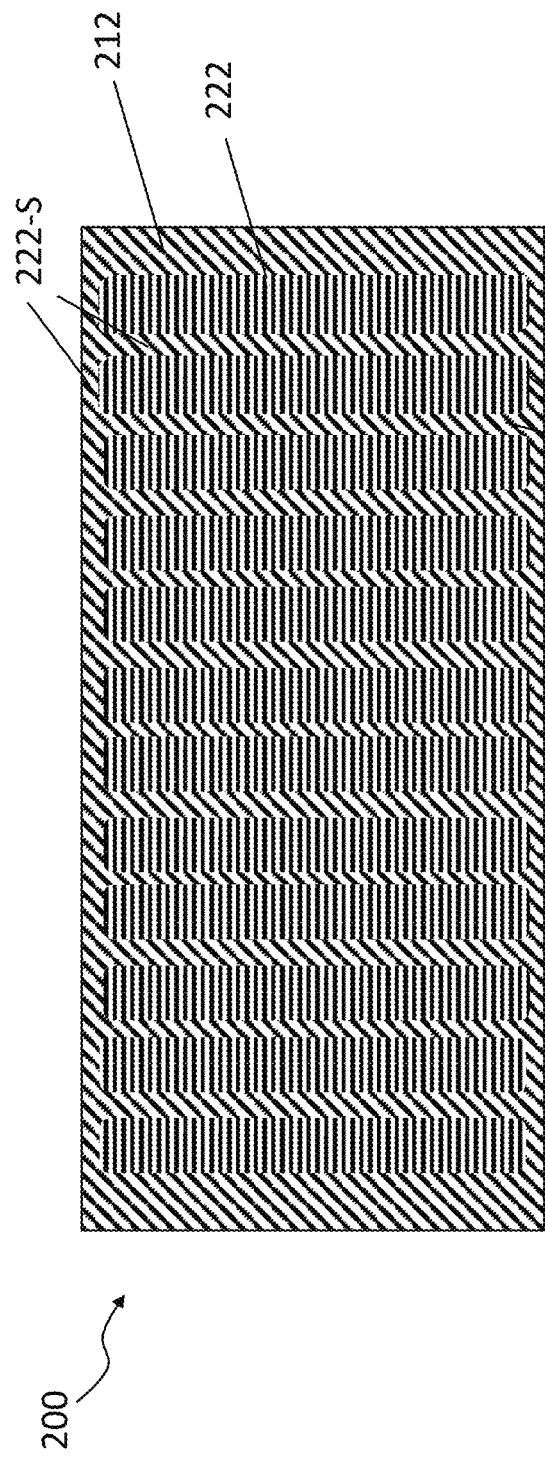
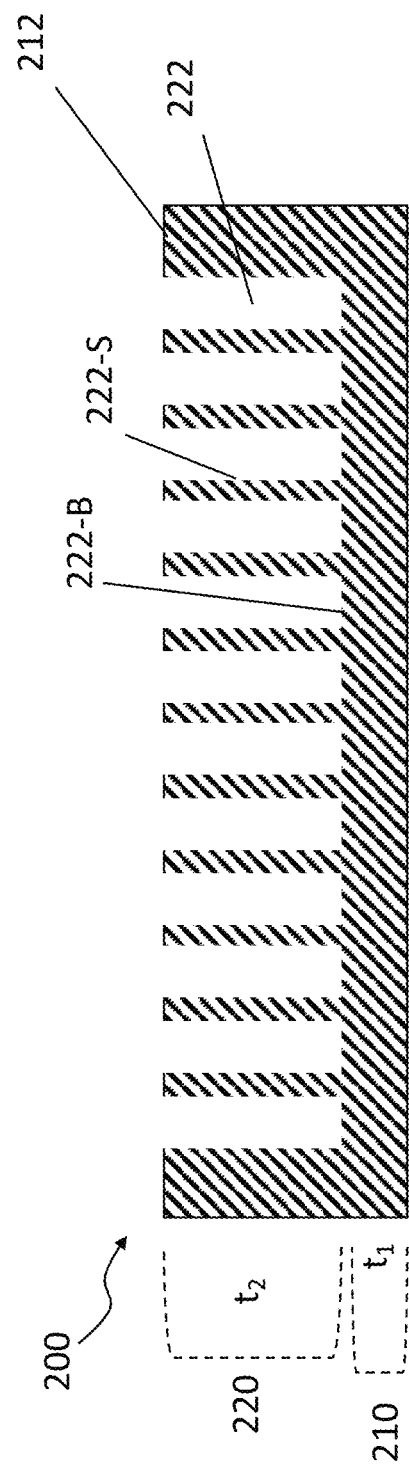

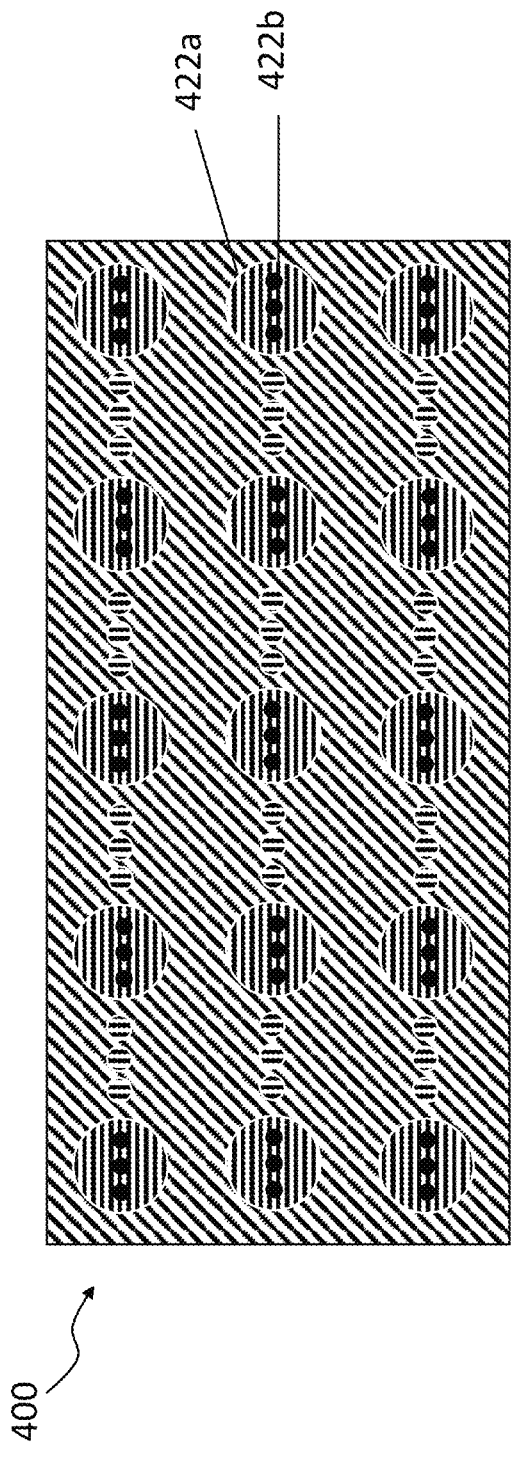
Fig. 4A
Fig. 4B

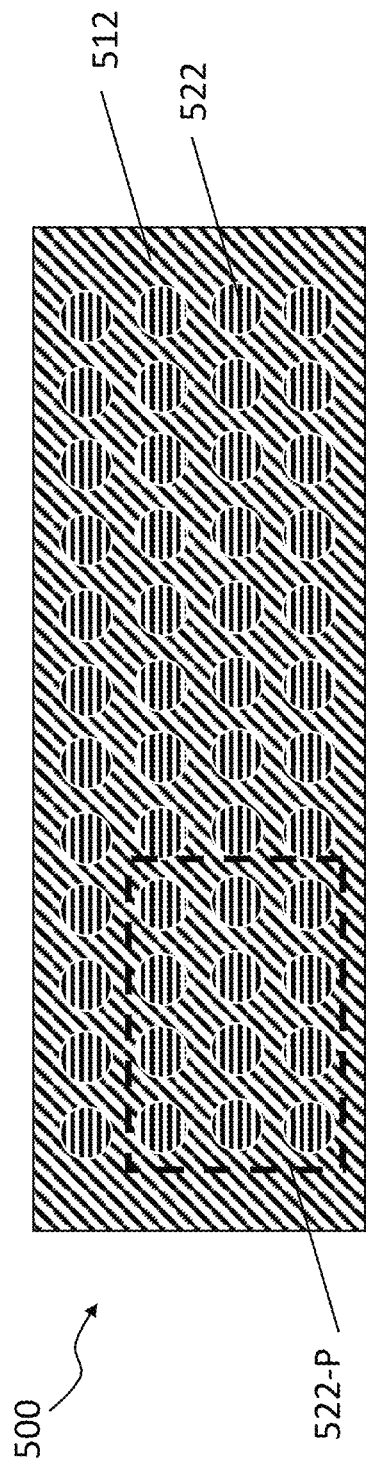
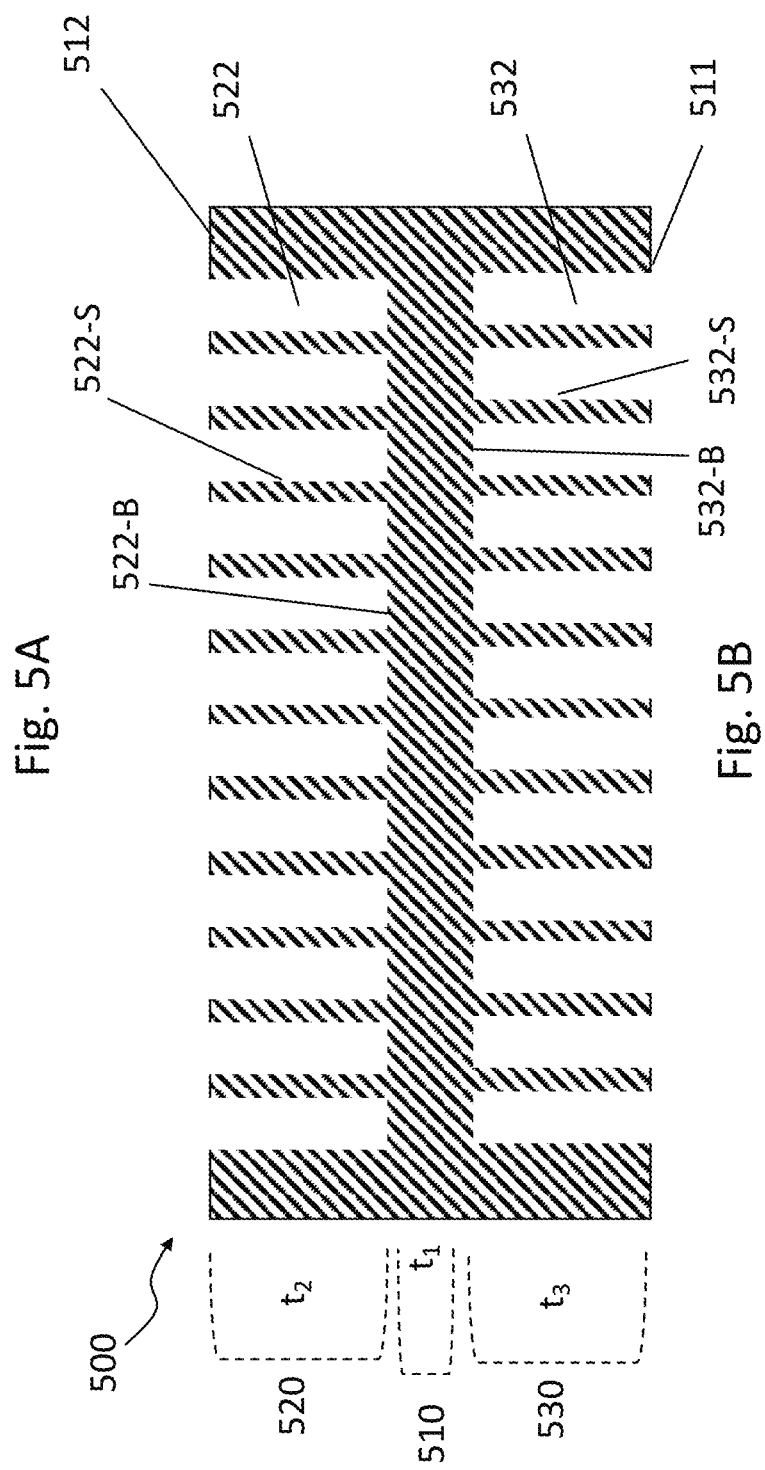
Fig. 5A
Fig. 5B

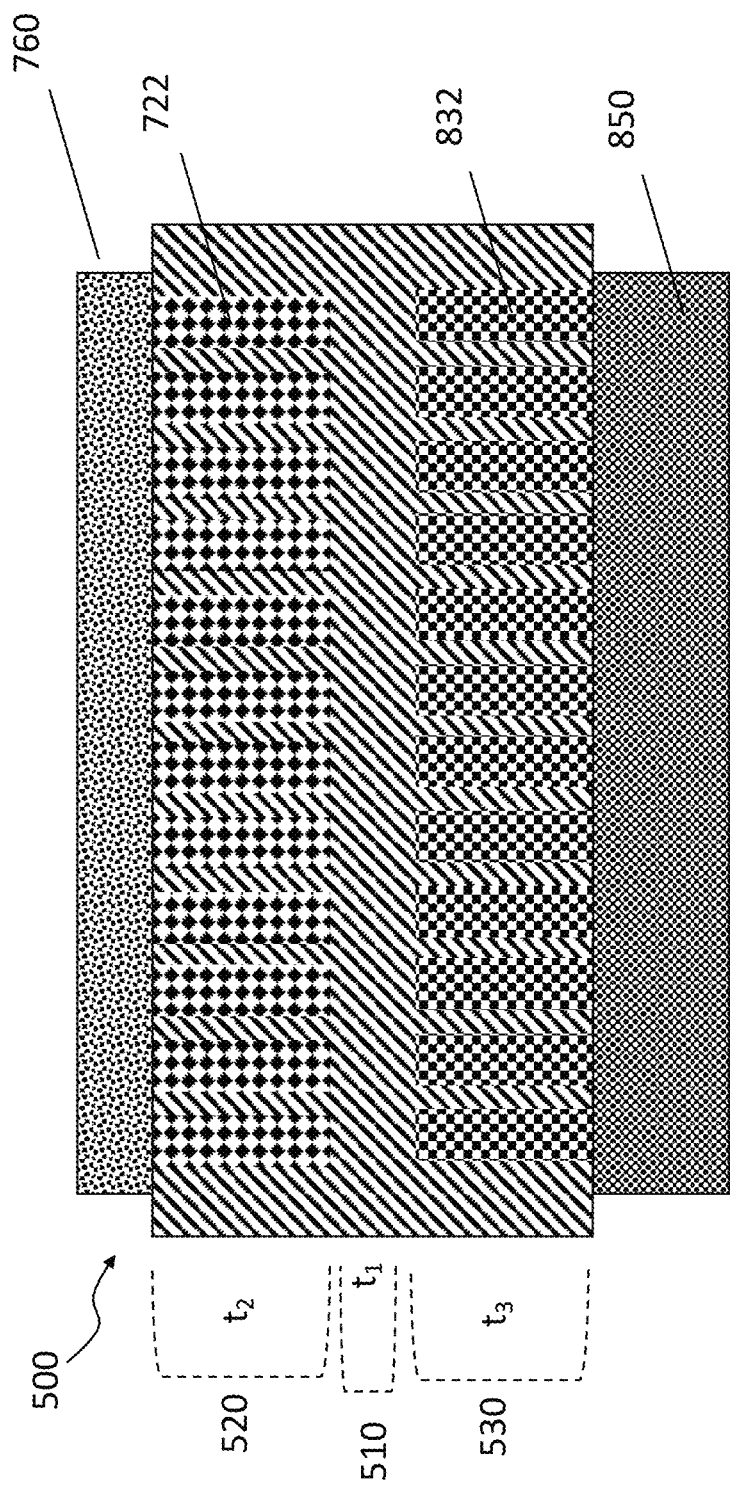

GLASS SOLID ELECTROLYTE LAYER, METHODS OF MAKING GLASS SOLID ELECTROLYTE LAYER AND ELECTRODES AND BATTERY CELLS THEREOF

STATEMENT OF GOVERNMENT SUPPORT

This invention was made with Government support under Award No.: DE-AR0000772 awarded by the Advanced Research Projects Agency-Energy (ARPA-E), U.S. Department of Energy. The Government has certain rights in this invention.

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

1. Field

This disclosure relates to batteries, and in particular to a battery electrode, separator electrode assembly, and battery cell that is based on a unitary structure of Li ion conducting sulfide glass. In various embodiments the electrode or battery cell is fully solid-state, and in particular embodiments wholly inorganic.

2. Description of Related Art

All solid-state batteries (ASSBs) have the potential to offer enhanced energy density and improved safety over conventional lithium-ion batteries. The various battery types may be differentiated by the composition and/or atomic structure of the solid electrolyte. For instance, categories may include solid polymer electrolytes, sulfide electrolytes (e.g., crystalline, glass, glass-ceramic), and oxide electrolytes (e.g., LLZO and LATP).

In particular, Li metal ASSBs hold the promise of exceptional specific energy and energy density. To achieve such high energy density, it has been reported that thick voluminous cathodes should be used as a battery substrate that provides mechanical support and allows for current collectors and lithium metal to be applied as thin coatings. However, thick composite or dense cathodes based on lithium metal oxide or phosphate intercalation compounds (e.g., LCO, NMC, NCA, LFP) are oftentimes hindered by poor ion transport into the depth of the cathode thickness, which limits the rates at which such an ASSB may be discharged and charged.

For electric vehicle applications, rate performance and low manufacturing costs are paramount. Accordingly, there remains a need for an improved method of manufacture and solid-state cell structures that are not limited by ion diffusion through a thick cathode substrate and can be manufactured at low cost.

SUMMARY

Disclosed are battery component structures and manufacturing methods for solid-state battery cells. In particular, a unitary Li ion conducting sulfide glass solid electrolyte structure is provided that serves as the basic building block around which a solid-state battery cell of the present disclosure is fabricated. In various embodiments, the unitary glass structure approach provided herein includes a method for making a solid-state battery cell that is based on a sulfide glass substrate having a precision engineered microstructure with highly anisotropic closed-end circular holes that form a regular hole pattern on the substrate surface. Moreover, some of the methods disclosed herein can leverage precision controlled high throughput processes from the semiconductor industry that have been inventively modified as disclosed herein for processing a sulfide glass solid electrolyte substrate into the instant unitary Li ion conducting glass structure, for example, by using etching and lithographic photoresist formulations and methods of the present disclosure. In one aspect the present disclosure provides a unitary Li ion conducting glass structure that is employed in a solid-state battery and serves as the basic building block for making a solid-state battery cell. In accordance with this aspect, the unitary glass structure is composed of a Li ion conducting sulfide glass monolith, typically in the form of a substantially flat glass substrate having first and second opposing major surfaces. The glass substrate may be precision engineered to effectuate a dense glass portion and a porous glass portion that are layer-like in the sense that the dense and porous portions have defined thickness across the structure and so can be characterized as sublayers having predetermined thicknesses. The porous glass sublayer includes a plurality of discrete substantially vertical closed-end holes or trenches that are precision engineered into one or both major substrate surfaces using microfabrication processes. In various embodiments the holes or trenches are formed using one or more etching processes of the present disclosure and, in particular embodiments, a predetermined and regular hole or trench pattern is created by combining etching with specialized masking and/or lithographic methods. For example, a substantially periodic or patterned array of high aspect ratio closed end holes may be lithographically etched into a Li ion conducting sulfide glass in accordance with these methods. Moreover, because the holes are made from the substrate surface, the methods described herein give rise to a planar surface hole or trench pattern that corresponds to, but may not exactly mimic, the hole and trench microstructure within the depth of the substrate. The surface hole pattern is pre-determined by the hole pattern of the mask or photoresist. In various embodiments it is contemplated that the circular hole pattern is regular with periodically spaced apart holes. However, hole pattern designs are contemplated that produce irregular circular hole patterns.

In accordance with the present disclosure the Li ion conducting unitary sulfide glass structures described herein are unitary in the sense that it is a single continuous material that is made by engineering microstructures into a single continuous substrate of Li ion conducting sulfide glass, as opposed to a structure that is composed of several material layers bonded together to form a structure. As a single continuous structure, there are no layer boundaries that could manifest as a grain boundary or bonding boundary.

In accordance with the present disclosure the Li ion conducting sulfide glass substrate is composed of Li ion conducting inorganic sulfide glass, which may be single phase or multi-phase. Li ion conducting glasses are generally composed of one or more glass network formers (e.g., $SiS_2$, $B_2S_3$, $P_2S_5$) and one or more glass network modifiers (e.g., $Li_2S$, $Li_2O$) and in some embodiments a dopant may be used for benefit such as to enhance conductivity and/or chemical stability (e.g., LiCl, LiI, Li3PO4). Inorganic sulfide glasses and sulfide glass sheets suitable for use herein as a Li ion conducting glass substrate for making a unitary Li ion conducting glass structure of the present disclosure are described in U.S. Pat. No. 10,164,289, hereby incorporated by reference.

In accordance with the present disclosure, the substantially vertical holes or trenches are formed from a major surface of the sulfide glass substrate to a predetermined depth within its bulk. Accordingly, the holes and trenches are "closed-end" by which it is meant that they do not penetrate the substrate to form a through hole or through slot. In various embodiments the closed-end holes or trenches, in addition to being vertically closed (i.e., not forming a through hole or slot) are also closed laterally by sidewall surfaces, and therefore the only surface opening of such holes or trenches is the open end on the substrate surface from which it was formed (i.e., the etching surface). Depending on the etching methods and microfabrication processes employed, the characteristic dimensions and shape of the holes and trenches may vary with penetration depth, and thus may not mimic the dimensions and shapes at the surface. In various embodiments the holes are circular. However, other hole shapes are contemplated including square, oval, triangular and rectangular holes (i.e. trenches). Combinations of different shaped holes are also contemplated.

In various embodiments, the unitary glass structure of the present disclosure is incorporated in a battery cell as a multifunctional component with both separator and electrode functionality, and, in such instances, as described herein below, the size and shape of the holes and trenches are suitable for receiving and accommodating electroactive material for the purpose of providing ampere-hour capacity in the battery in which the unitary glass structure is employed, with its holes and/or trenches filled with cathode or anode active material.

In various embodiments the unitary glass structure is a substantially flat Li ion conducting sulfide glass substrate having a plurality of closed-end holes or trenches that have been engineered into the substrate in such a manner as to be characterizable as having a asymmetric architecture composed of two sublayers each having a characteristic and predetermined sublayer thickness: i) a dense glass sublayer that extends into the substrate from the substrate second major surface; and ii) a porous glass sublayer with precision engineered closed-end holes and/or trenches that extend into the substrate from the substrate first major surface.

In various embodiments the unitary glass structure is a substantially flat Li ion conducting sulfide glass substrate characterizable as having a sandwich architecture composed of three sublayers each having a characteristic thickness: i) a first porous glass sublayer with precision engineered trenches defining the substrate first major surface; ii) a second porous glass sublayer with precision engineered trenches defining the substrate second major surface; and iii) a dense glass sublayer sandwiched between the first and second porous glass sublayers.

In various embodiments it is beneficial in order to prevent adverse reactions to the manufacturing environment (e.g., moisture) and/or battery component materials (e.g., electroactive material) to apply (e.g., by coating) a protective layer onto surfaces of the unitary Li ion conducting glass structure, including a conformal protective layer that coats the sidewall and bottom surfaces of the holes or trenches. For example, chemical vapor deposition (CVD) techniques, including atomic layer deposition (ALD) are particularly well suited for conformal coating, other techniques are also contemplated including solution and sol gel coating methods.

In other aspects the present disclosure provides a separator electrode assembly and a battery cell wherein the holes and/or trenches of the unitary glass structure are filled, fully or partially, with electroactive material, and the dense glass sublayer serves as a solid electrolyte separator layer or has solid electrolyte separator functionality and the porous glass sublayer(s) serve as electroactive layers.

For instance, in various embodiments a lithium metal battery cell is constructed from a unitary glass structure having a asymmetric architecture, in accordance with the present disclosure. Briefly, the closed-end holes and/or trenches of the first porous sublayer are filled with cathode active material (e.g., of the Li ion intercalating type) and the substrate second major surface, which is dense Li ion conducting sulfide glass, provides the surface for lithium metal plating during battery charging, and is preferably smooth and defect free. In various embodiments a protective layer is formed on the substrate second major surface as an interlayer to thereby enhance interfacial properties between the lithium metal and the glass substrate, and the same or different protective layer composition (e.g., a different protective layer) conformally coats the first substrate surfaces, including the sidewall and bottom surfaces defining the holes and/or trenches. The battery cell may be, wherein a current collecting layer is applied directly onto the protective layer on the second substrate surface (e.g., evaporated Cu metal layer). In such instances, the battery cell is constructed with an "anode free" configuration. In other embodiments, a thin layer of Li metal may be applied onto the layer (e.g., by Li metal evaporation), followed by laying down a current collecting layer (e.g., evaporated Cu metal layer). Particularly suitable cathode active materials of the Li ion intercalating type are lithium metal oxides (e.g., LCO, NMC, NCA, LFP, LNMO and the like). A dry or wet slurry mixture of the cathode active material, along with other material additives such as electronically conductive diluents (e.g., high surface area carbons), organic binders, and ionically conductive additives, including particles of Li ion conducting sulfide glass, may be used to fill the holes/trenches of the porous sublayer (e.g., via vacuum infiltration). Once infiltrated the first major surface may be coated with the slurry as an electroactive overlayer to support current collection and provide additional ampere-hour capacity, and thereafter the electroactive overlayer coated with a current collecting layer (e.g., Al metal, evaporated thereon).

In various embodiments, the cathode electroactive material is a compound of at least one metal and one or more of oxygen and sulfur and phosphorous (e.g., transition metal oxides, transition metal sulfides, and transition metal phosphates). In embodiments, the metal oxide or metal sulfide or metal phosphate active material is a Li ion intercalation material, as is understood in the battery art. In various embodiments, Li ion intercalation compounds (e.g., lithium metal oxides) are particularly well suited as the active material herein because they substantially retain their atomic structure after repeated charging and discharging cycles. Without limitation, particularly suitable transition metals for the metal oxide or metal sulfide or metal phosphate intercalation compounds are Co, Fe, Ni, Mn, Ti, Mo, V, and W. Particular examples include lithium nickel oxide (LNO), lithium nickel cobalt aluminum oxide (NCA), lithium cobalt oxide (LCO) lithium nickel cobalt manganese oxide (NCM), nickel cobalt aluminum manganese oxide (NCAM) and lithium iron phosphate (LFP).

In various embodiments a Li-ion battery cell is constructed from a unitary glass structure having a sandwich architecture, in accordance with the present disclosure. The sandwich structure has a first and second porous sublayer with holes and/or trenches that are filled with cathode and anode active material, respectively (i.e., the holes/trenches in the first porous sublayer filled with cathode active material, and anode active material for the second porous sublayer). For benefit, the substrate first and second major surfaces may be coated with a protective layer, including the sidewall and bottom surfaces of the holes/trenches, as described above and in more detail herein below. The protective layer composition for the first and second substrate surfaces may be the same or different. The first porous sublayer may be filled with cathode active material of the Li ion intercalating type and the second porous sublayer may be filled with anode active material of the Li ion intercalating type (e.g., graphite, silicon and combinations thereof and the like); for example, the holes/trenches filled using vacuum infiltration of an active material slurry. Electroactive overlayers composed of cathode active material or anode active material may be applied onto the first and second major surfaces, respectively, followed by deposition of current collecting layers (e.g., Cu metal layer onto the anode active overlayer and Al metal onto the cathode active overlayer).

In another aspect methods for making a Li ion conductive sulfide glass unitary structure of the present disclosure are provided. In various embodiments the methods involve processing a substantially flat and dense Li ion conducting sulfide glass solid electrolyte substrate using inventively modified microfabrication techniques employed in the semiconductor industry. In various embodiments etching solutions specifically formulated for wet etching sulfide electrolytes are disclosed herein. Also provided are lithographic techniques and masking methods for patterning a sulfide solid electrolyte with anisotropic closed-end holes and trenches, including photoresist formulations and methods for application and removal for sulfide solid electrolytes.

In yet other aspects, methods for making a separator electrode assembly and battery cell are provided. In particular, the methods involve processing a Li ion conductive sulfide glass unitary structure of the present disclosure as the basic building block around which the separator electrode assembly and battery cell are fabricated.

BRIEF DESCRIPTION OF THE DRAWINGS

FIGS. 1A-B illustrate a unitary Li ion conducting sulfide glass solid electrolyte structure having a asymmetric architecture and in the form of a substantially flat monolithic substrate having first and second major opposing surfaces, top-down and cross sectionally, respectively, in accordance with various embodiments.

FIGS. 2A-B illustrate unitary glass structure having a asymmetric architecture with discrete trenches instead of closed-end holes, top-down and cross sectionally, respectively, in accordance with various embodiments.

FIGS. 4A-B illustrate a unitary structure having asymmetric architecture with a multi-modal porous sublayer, top-down and cross sectionally, respectively, in accordance with various embodiments.

FIGS. 5A-B illustrate unitary Li ion conducting sulfide glass solid electrolyte structure having a sandwich architecture, top-down and cross sectionally, respectively, in accordance with various embodiments.

FIG. 8 illustrates a Li ion battery cell in accordance with various embodiments built from a Li ion conducting unitary structure having a sandwich architecture.

DETAILED DESCRIPTION OF SPECIFIC EMBODIMENTS

Figure 3:
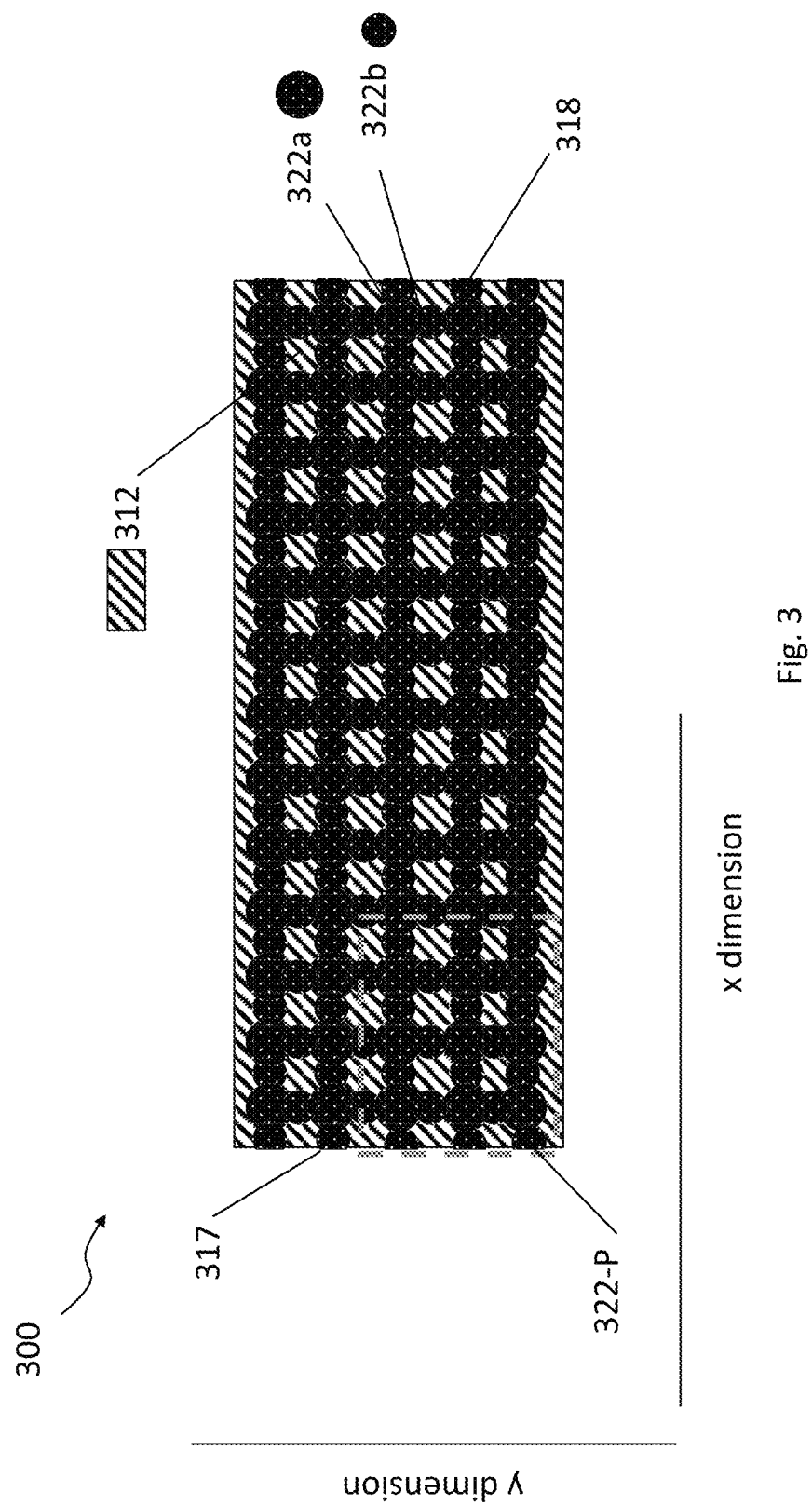
FIG. 3 illustrates in top-down view a unitary glass structure that is bi-modal and composed of first and second holes each having a different hole diameter in accordance with various embodiments.

Reference will now be made in detail to specific embodiments of the disclosure. Examples of the specific embodiments are illustrated in the accompanying drawings. While the disclosure will be described in conjunction with these specific embodiments, it will be understood that it is not intended to limit the disclosure to such specific embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. Embodiments of the present disclosure may be practiced without some or all of these specific details. In other instances, well known process operations have not been described in detail in order not to unnecessarily obscure the present disclosure.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

In FIGS. 1A-B there is illustrated a unitary Li ion conducting sulfide glass solid electrolyte structure 100 having an asymmetric architecture and in the form of a substantially flat monolithic substrate having first and second major opposing surfaces 111/112, in accordance with various embodiments of the present disclosure. FIG. 1A, illustrates a top-down view of structure 100 depicting substrate first major surface 111, and in FIG. 1B structure 100 is depicted in cross sectional view. Structure 100, for example substrateless and freestanding, can be engineered using microfabrication techniques of the present disclosure to have dense glass portion 110 characterizable as a dense sublayer and porous glass portion 120 characterizable as a porous glass sublayer.

With reference to FIG. 1B, dense glass portion 110 is a layer-like region wholly composed of Li ion conducting sulfide glass, and characterizable as a sublayer with thickness $t_1$. Generally, sublayer 110 is substantially devoid of pores having a dense glass surface 111, which is preferably smooth and free of defects and flaws, including pits and divots. Porous glass portion 120, similarly characterizable as a sublayer, can have a precisely controlled porous microstructure that, in various embodiments, has been processed by etching and lithography methods of the present disclosure, and, in particular, porous sublayer 120 may include a plurality of discrete substantially vertical closed-end holes 122 extending from substrate surface 112 into a depth that effectively defines thickness ($t_2$) of sublayer 120. As illustrated in the particular embodiment of FIG. 1B, holes 122 are discrete, substantially cylindrically shaped and have a closed-end bottom 122-B meaning that they do not penetrate through the substrate (between surfaces 112 to 111) to create a through-hole. The holes are also highly anisotropic with substantially vertical sidewalls 122-S and a characteristic diameter $D_h$ that may vary with depth, or, in other embodiments, remain substantially constant (as illustrated). Moreover, holes 122 are laterally closed in that the sidewalls fully surround the hole. With reference to FIG. 1A, substrate surface 112 may be characterized as having a surface hole pattern 122-P, which, in various embodiments is a substantially periodic regular array of closed-end spaced-apart substantially circular shaped holes. In various embodiments the surface hole pattern is unimodal (as illustrated in FIG. 1), or bi-modal, or multi-modal and the closed-end holes 122 are engineered with diameters or planar dimensions suitable for receiving and accommodating electroactive material (e.g., cathode active material) in a manner that allows the electroactive material (e.g., cathode active material) to be electrochemically oxidized and reduced during charge and discharge in a battery cell.

While substantially cylindrical holes are depicted in FIGS. 1A-B, a non-exhaustive variety of hole patterns are contemplated for the porous sublayer, including multi-modal varieties and trenches, and laterally connected holes. Other parameters include hole or trench density (number/ mm$^2$), planar shape (e.g., circular) and hole dimension(s) and depth, as well as variations of shape and dimension with depth. By way of non-limiting example, a few representative options are described with reference to FIGS. 2-4.

In FIGS. 2A-B, there is illustrated a unitary glass structure 200 having an asymmetric architecture with discrete trenches 222 instead of closed-end holes. Structure 200 is shown in top-down view in FIG. 2A and cross sectionally in FIG. 2B. Features numbered in FIG. 1 and having a first numeral of 1 are similarly numbered in FIG. 2 with a first numeral of 2; for instance, first and second substrate surfaces 211/212, trenches 222, trench sidewalls 222-S, trench bottom surface 222-B, dense glass sublayer 210 having characteristic thickness $t_1$ and porous glass sublayer 220 having characteristic thickness $t_2$. Trenches 222 regularly repeat in spaced apart fashion. Moreover, the trenches are laterally closed, fully surrounded by solid electrolyte sidewalls 222-S and having a single opening on substrate major surface 212. By definition the trenches are closed-end, and do not penetrate so deep into the substrate as to form a through slot.

In FIG. 3 there is illustrated in top-down view a unitary glass structure 300 that is bi-modal and composed of first and second holes 322a/322b each having a different hole diameter, wherein diameter of 322a>322b. Another interesting feature of this pattern is that the holes are interconnecting and thus effectively form intersecting trenches in both the x and y dimensions. Moreover, the trenches extend to the substrate side edges 317/318 and therefore have openings at substrate major surface 312 and side edges 317/318, which can be beneficial when filling the trenches with electroactive material, as described in more detail herein below.

In FIGS. 4A-B a unitary structure 400 having asymmetric architecture with a multi-modal porous sublayer 420 is illustrated top-down and cross sectionally, respectively. The structure includes a bi-modal patterned array of composite hole 422a/b and hole 422c. Composite hole 422a/b can be readily deconvoluted into first hole 422a which is the larger of the holes and second hole 422b, which is a smaller hole that extends deeper into the substrate, and essentially comes in a set of three holes along the x-axis of the substrate, giving rise to a finger-like shape. And hole 422c also patterned in a set of three along the x-axis, is isolated and spaced apart from composite hole 422a/b. In accordance with the present disclosure, composite holes such as hole 422a/b may be formed, as described below, using dry etching methods (e.g., first forming hole 422a followed by dry etching, inside hole 422a, a set of three holes of the 422b type.

In FIG. 5A-B there is illustrated unitary Li ion conducting sulfide glass solid electrolyte structure 500 having a sandwich architecture in accordance with various embodiments of the present disclosure. The sandwich architecture is similar to the asymmetric architecture described in FIG. 2, and similarly numbered, except that structure 500 has an additional porous sub layer 530 with closed end holes 532. Moreover, dense glass sublayer 510 is sandwiched between sublayer 530 and first sublayer 520. The sandwich architecture is particularly suitable for use in and for making a Li-ion battery cell, wherein holes 520 are filled with cathode active material and holes 530 are filled with anode active material. In various embodiments the hole pattern and porous microstructure of sublayer 520 is different than that of sublayer 530 (e.g., a different total porosity, different thickness, different surface hole pattern, or a different hole shape and size). Further details concerning the fabrication of such a Li-ion battery cell and the sandwich unitary structure from which it is built around, is provided below.

As described herein, in combination with the thickness of the dense glass sublayer, the microstructure and hole pattern of the porous sublayer(s) can be adjusted to target a particular battery application. For instance, a high number density of narrow holes for enhanced battery power, or larger holes for an application in need of a compact or lightweight high energy density cell. The density of holes and their diameter and depth are factors to consider in terms of manufacturability, cost and overall structural strength.

With reference to FIGS. 1-5, in various embodiments dense glass sublayer thickness ($t_1$) is from 1 to 50 µm, or from 1 to 10 µm or from 5 to 20 µm, or from 20 to 30 µm, or from 30 to 50 µm. Thickness of the porous glass sublayers depend on a number of factors, including the material makeup of the battery cell (e.g., type of active material), target performance in terms of energy and power density and the pore microstructure, including total porosity. Thickness of the porous glass sublayer is generally measured between the substrate surface from which the hole is etched and the length of the deepest extending hole or trench depth. In various embodiments porous glass sublayer thickness ranges from 5 to 1000 um (e.g., 5 to 20 um, or 20 to 50 um, or 50 to 100 um, or 100 to 200 um, or 200 to 500 um, or 500 to 1000 um). The overall porosity of the porous glass sublayers may be in the range from 10% to 90%. Total porosity is oftentimes a tradeoff between mechanical strength of the unitary structure and energy or power density of the battery. In particular embodiments total porosity of the porous sublayer is about 10%, or about 20%, or about 30%, or about 40%, or about 50%, or about 60%, or about 70%, or about 80%, or about 90%.

In various embodiments the closed-end holes have substantially uniform and regular diameters along their length. Typically, the holes have a circular cross section. However, the present disclosure contemplates diameters that vary along the length of the hole. Such a variation may result from the manner by which the hole is formed (e.g., wet etching), and this is described in more detail below. In various embodiments the hole diameter (when circular) or largest planar dimension for a square, oval or other shaped hole is in the range of >50 to 100 um, or >10 to 50 um, or >5 to 10 um, or >1 to 5 um, or less than 1 um (e.g., >100 nm to 1 um). In various embodiments the holes have diameter less than 100 nm (e.g., about 50 to 100 nm). Hole patterns and geometries are generally not limited. The holes are substantially vertical and highly anisotropic (e.g., cylindrical) with length to diameter aspect ratios of at least 2:1, or at least 10:1 (e.g., about 2:1, or about 5:1, or about 10:1, or about 20:1, or about 50:1; or about 100:1, or about 1000:1, or >1000:1). Generally, the number hole density (number of holes/mm$^2$) is related to the total porosity of the porous sublayer. In various embodiments the number hole density is in the range of 1000 holes/mm$^2$ to 10,000 holes/mm$^2$, hole densities (holes/mm$^2$) greater than 20,000, or greater than 50,000 or greater than 100,000 are also contemplated.

Precise control of the porous sublayer microstructure is achieved by using etching methods of the present disclosure combined with lithography techniques, to create engineered holes and trenches with specific geometric patterns and precise diameters and aspect ratios. In particular, precise geometric hole patterns may be engineered into the unitary glass structure using lithographic masking techniques modified for their applicability to be used for etching Li ion conducting sulfide solid electrolyte substrates.

In accordance with the present disclosure, methods for making unitary glass structures using etching and masking techniques are provided. Generally, the methods involve exposing precisely defined surface regions of a dense Li ion conducting sulfide glass with an etching media. In various embodiments the method involves: i) providing Li ion conducting sulfide glass substrate (e.g., a dense glass monolith) having first and second major opposing surfaces; and ii) exposing precisely defined surface regions to an etching media for a time that is sufficient to form the desired shape and depth. In various embodiments a patterned mask or masking layer may be used to define the etching regions. In preferred embodiments, masking techniques and lithographic processes are employed for exceptional precision and control over the size and location of the holes or trenches.

In accordance with embodiments of the present disclosure the porous sublayers are formed by etching processes, including wet or dry etching methods of the present disclosure, and combinations thereof.

In various embodiments the porous sublayer(s) are engineered into a Li ion conducting sulfide glass monolith (e.g., in the form of a glass sheet) using a wet etching process of the present disclosure. Li ion conducting sulfide glasses are extremely sensitive to moisture. In the presence of water or its vapor, sulfide glasses undergo rapid hydrolysis followed by evolution of hydrogen sulfide gas. In order to reduce the hydrolysis rate, water can be mixed with non-aqueous solvents that don't react with the glass. In particular, mixtures with very low water content can be prepared. In various embodiments, mixtures of water with glymes, for instance DME, are prepared and utilized to decrease the rate of glass hydrolysis. The mixtures having an $H_2O$ to DME ratio of 1:1, 1:5, 1:10, 1:20 1:50, 1:100, 1:200, 1:500, 1:1000 can be used for sulfide glass etching. In other embodiments, mixtures of water vapor and a carrier gas (nitrogen or argon) are used.

It is difficult to control the process of hydrolysis where at least one of the hydrolysis products is a salt poorly soluble in water. This can result in blocking of the glass surface with a solid precipitate and a progressive reduction in the rate of hydrolysis. For instance, hydrolysis of $Li_2S$—$P_2S_5$ glasses leads to formation of lithium orthophosphate having low solubility in water. In order to prevent formation of insoluble products, strong inorganic acids such as hydrochloric acid, can be used.

Since hydrochloric acid is soluble in acetonitrile, in various embodiments low concentration solutions of hydrochloric acid in acetonitrile may be used as etching media. After the etching process is complete, the glass surface is rinsed with an excess of acetonitrile, which does not react with sulfide glasses.

In a specific case, organic carbonic acids may be used for etching of sulfide glasses. Formic, acetic, propionic, butyric, oxalic, and malonic acids are particularly suitable.

It was found that liquid formic, acetic, propionic, and butyric acids are miscible with certain aprotic solvents, in particular, glymes and organic carbonates, which are not reactive to sulfide glasses. The solid carbonic acids such as oxalic and malonic acids, have a significant solubility in these solvents. In various embodiments, in order to etch sulfide glasses and adjust the rate of glass hydrolysis (or completely eliminate it) mixtures of formic, acetic, propionic, and butyric acids with glymes, in particular, DME, diglyme or triglyme, or with organic carbonates, in particular, DMC, may be used.

In various embodiments, etching of sulfide glasses occurs in a gaseous phase containing a vapor of carbonic acids or their mixtures with carrier gases (nitrogen or argon). Regulation of the acid vapor pressure is achieved by changing the temperature or adjusting the ratio between the acid in the vapor phase and the carrier gas.

In various embodiments, the chemical etching process may include more than one step. In a particular case, a controlled hydrolysis step can be followed by a glass surface treatment with acidic solutions to dissolve the precipitate(s) consisting of compounds with low solubility in water. Finally, the glass surface is rinsed with aprotic solvents, such as glymes and organic carbonates, in order to remove water and acids from the glass surface.

In various embodiments, a sulfide solid electrolyte substrate is masked and then moved to a container where the unprotected (unmasked) substrate surface is exposed to an etching solution in order to produce a porous glass layer on the surface of a dense glass layer. After removal of the mask, the active components of the etching solution, such as water and acid, are rinsed away with an excess of an aprotic solvent. Wet etching may render a more concave shape along the depth of the hole, and, depending on how the wet etch is applied to the glass surface, may result in an isotropically etched hole.

In various embodiments a dry etching method is provided for creating the porous sublayer, including chemical and physical dry etching processes (e.g., plasma etch). Dry plasma etching may involve exposing glass surface regions to a chemically reactive plasma (a chemical process), leading to volatization and removal of glass reactive species. In various embodiments the dry plasma etch is a physical process performed using ion plasma etching (ion milling) (which is particularly well suited for creating micropore and small mesopore holes). For example, the etching is performed in an argon plasma.

In other embodiments a different physical process may be used that is based on the interaction of laser irradiation with the sulfide glass to create pores of various sizes into the sulfide glass substrate surface(s). This includes utilizing ultraviolet excimer lasers for glass ablation. High speed laser micromachining with high intensity picosecond or femtosecond pulsed lasers may also be used.

In various embodiments, the porous sublayer is created using a patterned structural mask (e.g., fabricated from metals and plastics). Mineral oil may also be used for masking areas that are outside the etching zone but may nonetheless be nearby the etching media. Aluminum, chromium, titanium and nickel masks are particularly suitable for wet etching processes that use a carbonic acid etchant. In particular embodiments, a titanium mask is used in combination with etching media based on acetic, formic, malonic, butyric, and propionic acids; nickel masks are particularly suitable when used in combination with malonic, oxalic, and formic acids; and aluminum masks for propionic and butyric acids.

In various embodiments, the method for making the porous glass sublayer involves lithography processes, including photolithography and electron beam lithography.

Photolithography is a process widely used by the microelectronics industry. The process involves transferring geometric patterns from a photomask to a light sensitive photoresist that is coated onto a substrate surface. In accordance with the present disclosure, photolithographic techniques are generally applied for patterning a hole or trench structure/pattern into an ionically conducting solid electrolyte to create a porous sublayer. Moreover, known photolithography processes cannot be used for Li ion conducting sulfide solid electrolytes due to their high reactivity to moisture. Accordingly, lithography processes provided herein have been specifically developed for creating porous sublayers into inorganic sulfide ion conducting solid electrolytes. In particular, conventional aqueous media that is used for semiconductor processing is replaced herein with dried non-aqueous media throughout all steps of the photolithography processes, and all heat treatments are performed below the glass transition temperature of the Li ion conducting sulfide glass substrate.

In various embodiments, negative photoresists are used in the lithography processes of the present disclosure. In other embodiments, positive photoresists may be used.

Photoresist application onto the surface of the Li ion conducting sulfide glass substrate is performed by dipping, spraying or, in a specific case, by spin coating. The utilized photoresists contain polymerized phenolic resins and dry organic solvents, such as PGMEA, ethyl lactate, or butyl acetate (having b.p. as low as 127° C.). The soft-baking step necessary to remove solvents from the photoresist, as well as hard-baking, which is the final step of the photolithographic process, are done at a temperature lower than $T_g$ of the sulfide glass (50° C. lower, 20° C. lower, at least 10° C. lower). After soft-baking, the photoresist (in the areas unprotected with mask) is exposed to short wavelength visible light or UV light. The following step of photoresist removal (in the exposed areas for positive photoresists and in the unexposed areas for negative photoresists) is called developing. In standard lithography, developing is usually performed in aqueous solutions of sodium hydroxide or tetramethylammonium hydroxide (TMAH). Herein developing media based on solutions of TMAH in dry aprotic solvents may be used. In a specific case, the developing solution is a solution of TMAH in acetonitrile. After the photoresist is no longer needed, it is removed by washing in dry NMP. In another case, the photoresist is removed with oxygen plasma.

Figure 6A:
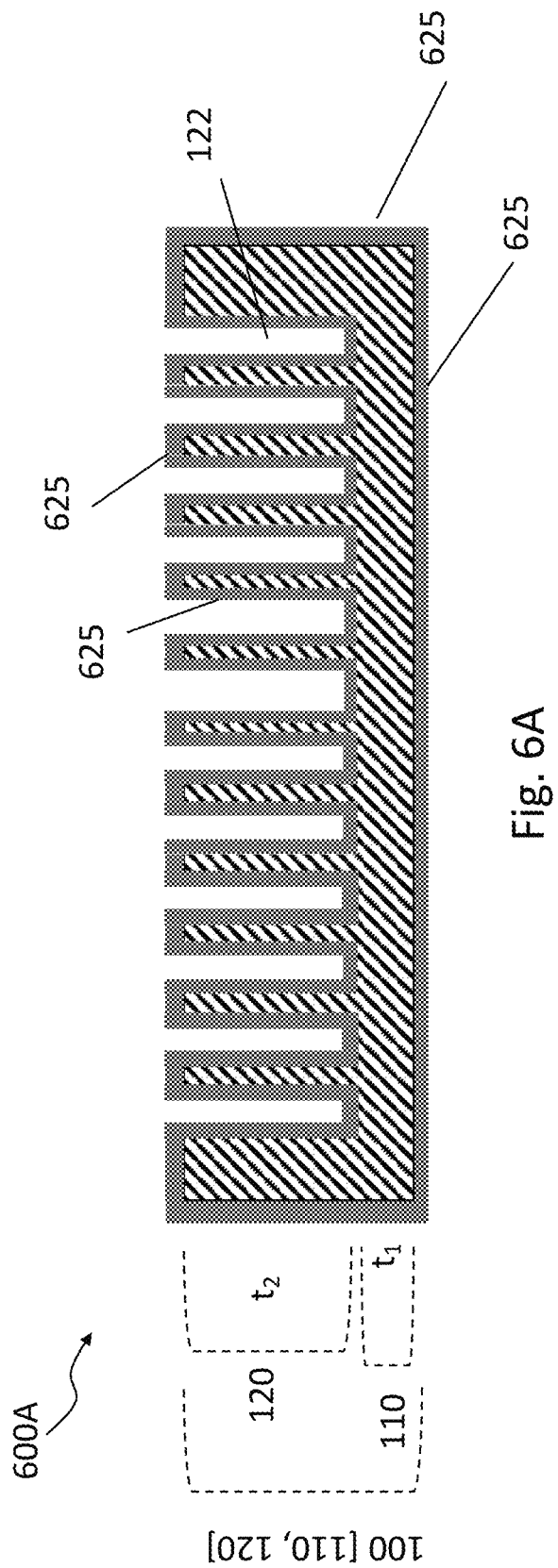
FIG. 6A illustrates a unitary Li ion conducting sulfide glass structure composed of unitary structure having a conformal protective layer covering a major surface, sidewall and bottom surfaces, in accordance with various embodiments.

In FIG. 6A a unitary Li ion conducting sulfide glass structure 600A is illustrated composed of unitary structure 100 as illustrated in FIG. 1 having conformal protective layer 625 covering major surface 112 and sidewall and bottom surfaces 122-S/122-B. Protective layer 625 is deposited using a conformal coating technique that is able to coat the sidewall surfaces (e.g., using chemical vapor deposition, and in particular atomic layer deposition, ALD). Thickness of layer 625 is generally less than 1 um, and more typically less than 200 nm, or less than 100 nm, or less than 50 nm or less than 20 nm (e.g., about 10 nm or about 5 nm). Particularly suitable protective layer compositions include $Li_2SiO_3$, $Li_4Ti_5O_{12}$, $LiTaO_3$, $LiAlO_2$, $Li_2O$—$ZrO_2$, $LiNbO_3$, and metal oxides, such as $Al_2O_3$, $TiO_2$, $V_2O_5$ and others, that, in particular, prevent glass oxidation in contact with cathode active material. Protective layer 625 is applied onto glass structure 100 prior to infiltrating the pore channels or prior to applying a lithium metal layer onto the surface of unitary glass structure face 112.

Figure 6B:
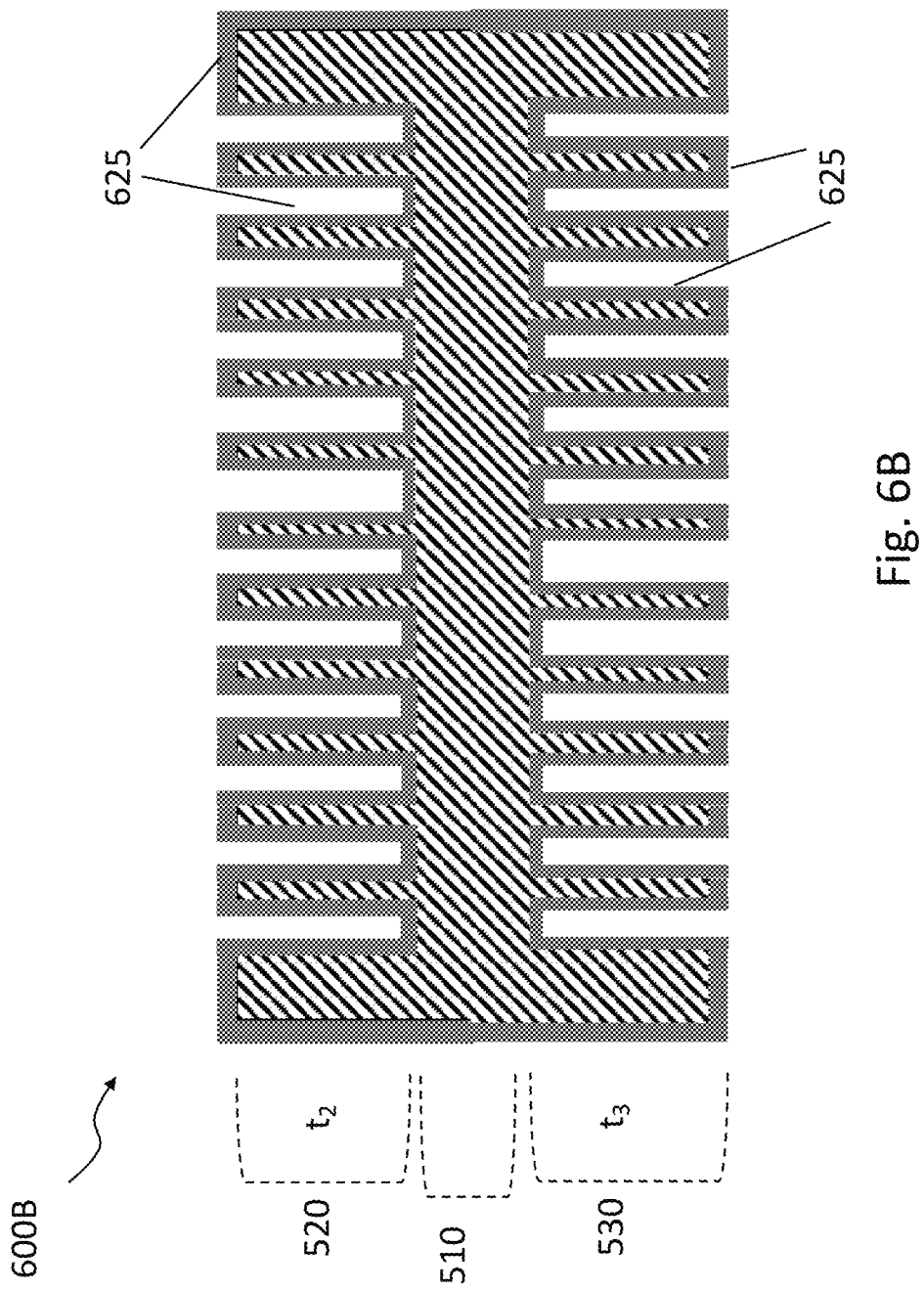
FIG. 6B illustrates a unitary structure having a sandwich architecture coated with a protective layer, in accordance with various embodiments.

In FIG. 6B, a unitary structure 600B coated with a protective layer is illustrated. In similar fashion to that described above with reference to protective layer coated unitary structure 600A in FIG. 6A, the surfaces of unitary structure 500 are coated with protective layer 625. In various embodiments the composition of protective layer is same for both porous sublayers 520 and 530. However, it is contemplated that different compositions may be used.

Figure 7:
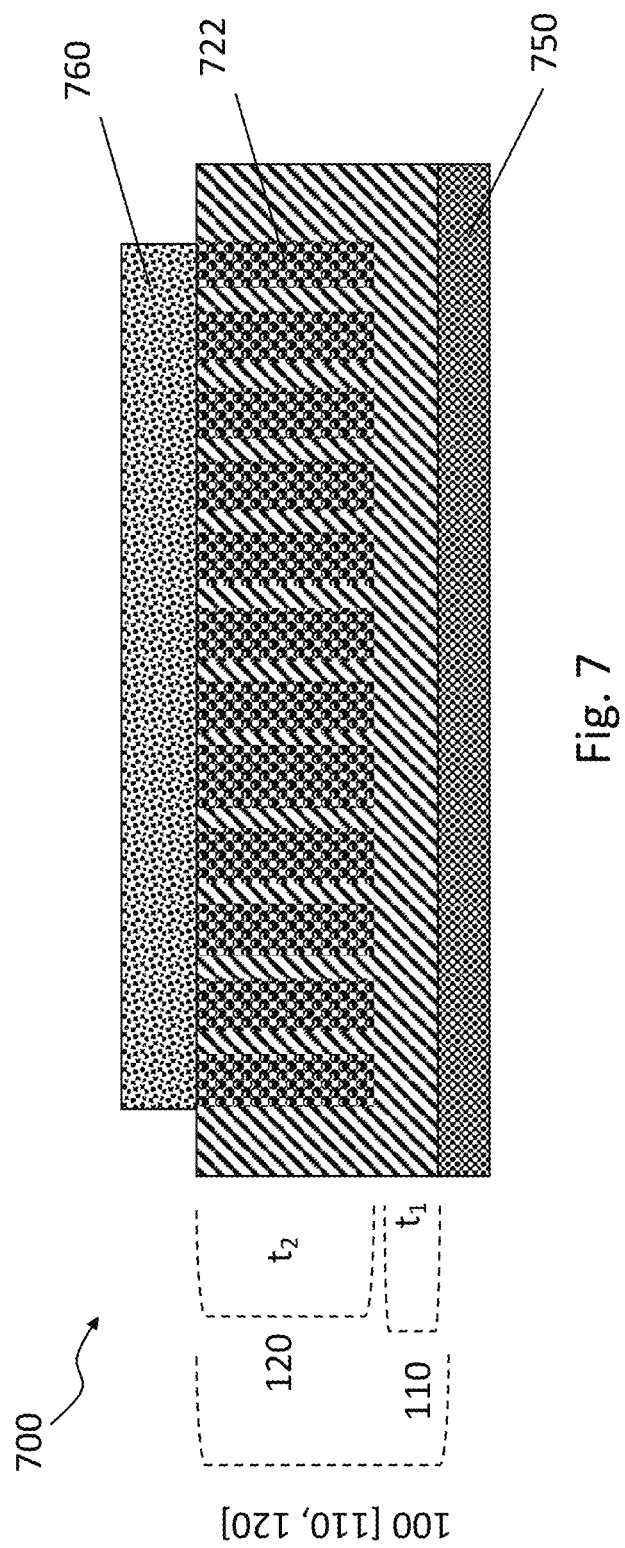
FIG. 7 illustrates a battery cell built using asymmetric unitary structure in accordance with various embodiments.

In FIG. 7 there is illustrated battery cell 700 in accordance with various embodiments of the present disclosure. In various embodiments cell 700 is a lithium metal battery cell having lithium metal negative electrode and a positive electrode composed of Li ion intercalating cathode active material. Cell 700 is built using asymmetric unitary structure 100 as illustrated and described in FIG. 1 and having protective layer 625 as described herein with reference to FIG. 6. For the sake of clarity, protective layer 625 is not shown in FIG. 7.

Cell 700 includes cathode active material 722 disposed inside holes 122 and lithium metal layer 760. Surfaces of unitary glass structure 100 are covered by a protective film that enhances or renders interfacial stability between the surfaces of the Li ion conducting sulfide glass and the cathode and anode active material. Cathode active material 722 may be loaded into the holes using vacuum impregnation. For instance, a slurry consisting of active material, polymeric binder and conductive additive (e.g., carbon black or the like) and in some instances also including Li ion conducting sulfide glass particles dispersed in an appropriated liquid solvent (e.g., NMP) is impregnated into the pore channels, and then dried. Multiple impregnation and drying steps may be performed to provide the desired particle loading. When the slurry includes Li ion conducting sulfide glass particles, those particles are generally also surface coated with a protective layer. Generally, battery cell 700 further includes cathode active material overlayer 660, which may be formed onto surface 111 during or after impregnating the holes with cathode active material. A current collector is then generally applied onto the cathode overlayer (e.g., by evaporating a thin layer of Al metal). In various embodiments, lithium metal layer 750 is deposited onto protected surface 111 (e.g., using vacuum evaporation or other suitable physical vapor deposition approach). In other embodiments it is contemplated that the battery cell is built with an anode free configuration, and a current collector is applied directly onto surface 111.

In FIG. 8 there is illustrated battery cell 800 in accordance with various embodiments of the present disclosure that is composed and built from a Li ion conducting unitary structure having a sandwich architecture, as illustrated in FIG. 5 and including a protective layer as illustrated in FIG. 6B. Cell 800 is a lithium ion battery wherein cathode active material 722 is loaded into the holes in sublayer 520 and anode active material 832 is loaded into the holes in sublayer 530. The major surfaces are also covered with electroactive layers. Major surface 112 is covered by a cathode active material overlayer 760 and major surface 111 is covered by an anode active material overlayer 850. In various embodiments both the cathode and anode active materials are of the Li ion type. For example, cathode active material 722 and overlayer 760 of the lithium metal oxide type (e.g., LCO, LFP, NCA, or NMC or the like), and anode active material 832 and overlayer 850 composed of intercalating graphite or silicon or other anode active material, including lithium intercalating titanates.

CONCLUSION

Although the foregoing disclosure has been described in some detail for purposes of clarity of understanding, it will be apparent that certain changes and modifications may be practiced within the scope of the appended claims. It should be noted that there are many alternative ways of implementing both the process and compositions of the present disclosure. Accordingly, the present embodiments are to be considered as illustrative and not restrictive, and the disclosure is not to be limited to the details given herein.

All references cited herein are incorporated by reference for all purposes.

What is claimed:

1. A method of making a unitary Li ion conducting glass structure, the method comprising:
   i) providing a substantially dense and flat Li ion conducting sulfide glass substrate, the substrate having first and second opposing major surfaces;
   ii) etching a hole pattern into one or both major surfaces to produce a plurality of discrete spaced-apart closed end holes and/or trenches, wherein the etching involves contacting the substrate surface with an etching media; and
   wherein the etching involves exposing the first major substrate surface to a liquid etching solution comprising water as etchant and acetonitrile as carrier solvent that is inert in direct contact with the glass substrate.

2. A method of making a unitary Li ion conducting glass structure, the method comprising:
   i) providing a substantially dense and flat Li ion conducting sulfide glass substrate, the substrate having first and second opposing major surfaces;
   ii) etching a hole pattern into one or both major surfaces to produce a plurality of discrete spaced-apart closed end holes and/or trenches, wherein the etching involves contacting the substrate surface with an etching media; and
   wherein the etching involves exposing the first substrate surface to a liquid etching solution comprising an organic carbonic acid as the etchant and a carrier solvent that is inert in direct contact with the glass substrate.

3. The method of claim 2 wherein the carrier solvent is an aprotic solvent selected from the group consisting of glymes and organic carbonates.

4. A method of making a unitary Li ion conducting glass structure, the method comprising:
   i) providing a substantially dense and flat Li ion conducting sulfide glass substrate, the substrate having first and second opposing major surfaces;
   ii) etching a hole pattern into one or both major surfaces to produce a plurality of discrete spaced-apart closed end holes and/or trenches, wherein the etching involves contacting the substrate surface with an etching media; and
   wherein the etching media is a gaseous/vapor etching mixture comprising an organic carbonic acid as etchant and a carrier gas that is inert in direct contact with the glass substrate.

5. A method of making a unitary Li ion conducting glass structure, the method comprising:
   i) providing a substantially dense and flat Li ion conducting sulfide glass substrate, the substrate having first and second opposing major surfaces;
   ii) etching a hole pattern into one or both major surfaces to produce a plurality of discrete spaced-apart closed end holes and/or trenches, wherein the etching involves contacting the substrate surface with an etching media; and
   wherein the etching media is a gaseous/vapor etching mixture comprising water as the etchant and a carrier gas that is inert in direct contact with the glass substrate.

6. The method of claim 5 wherein the carrier gas is one or more of argon gas and nitrogen gas.

* * * * *